US006900775B2

(12) United States Patent
Shapira

(10) Patent No.: US 6,900,775 B2
(45) Date of Patent: May 31, 2005

(54) ACTIVE ANTENNA ARRAY CONFIGURATION AND CONTROL FOR CELLULAR COMMUNICATION SYSTEMS

(75) Inventor: Joseph Shapira, Haifa (IL)

(73) Assignee: Celletra Ltd., Yokneam Ilit (IL)

( * ) Notice: Subject to any disclaimer, the term of this patent is extended or adjusted under 35 U.S.C. 154(b) by 0 days.

(21) Appl. No.: 09/357,844

(22) Filed: Jul. 21, 1999

(65) Prior Publication Data

US 2003/0073463 A1 Apr. 17, 2003

Related U.S. Application Data

(63) Continuation-in-part of application No. 09/171,986, filed on Oct. 30, 1998, now Pat. No. 6,697,641, and a continuation-in-part of application No. PCT/IL98/00103, filed on Mar. 3, 1998.

(30) Foreign Application Priority Data

| Mar. 3, 1997 | (IL) | ................................................ 120364 |
| Apr. 20, 1997 | (IL) | ................................................ 120706 |
| Jun. 30, 1997 | (IL) | ................................................ 121201 |

(51) Int. Cl.$^7$ .............................................. H01Q 21/00
(52) U.S. Cl. .................... 343/844; 343/853; 455/562.1; 342/372
(58) Field of Search ................................. 343/797, 844, 343/853; 455/562.1; 342/371–374; H01Q 21/00

(56) References Cited

U.S. PATENT DOCUMENTS

| 3,436,691 A | 4/1969 | Hoffman et al. |
| 3,491,314 A | 1/1970 | White |
| 4,647,880 A | 3/1987 | Argaman ..................... 333/164 |
| 4,914,445 A | * 4/1990 | Shoemaker .................. 343/853 |
| 5,017,927 A | 5/1991 | Agrawal et al. ............. 342/371 |
| 5,280,472 A | 1/1994 | Gilhousen et al. ............ 370/18 |

(Continued)

FOREIGN PATENT DOCUMENTS

| EP | 722 227 | 7/1996 |
| WO | 96/00991 | 1/1996 |

*Primary Examiner*—Michael C. Wimer
(74) *Attorney, Agent, or Firm*—G.E. Ehrlich (1995) Ltd.

(57) ABSTRACT

Various antenna arrangements are provided with active transmit and receive antenna elements for transmitting and receiving signals within a cellular communication system. Also presented are specific base station antenna systems and methods, and portions thereof, which improve and control specific characteristics and features of antenna systems including antenna beam patterns. In addition, method for the optimization of a cellular communications network is provided which exploits reverse-link, forward-link, and pilot signal information to optimize network operations.

19 Claims, 25 Drawing Sheets

U.S. PATENT DOCUMENTS

| | | | |
|---|---|---|---|
| 5,455,537 A | 10/1995 | Larkin et al. | 330/52 |
| 5,485,120 A | 1/1996 | Anvari | 330/151 |
| 5,489,875 A | 2/1996 | Cavers | 330/151 |
| 5,499,395 A | 3/1996 | Doi et al. | 455/33.1 |
| 5,513,176 A | 4/1996 | Dean et al. | 370/18 |
| 5,530,449 A * | 6/1996 | Wachs et al. | 342/174 |
| 5,533,011 A | 7/1996 | Dean et al. | 370/18 |
| 5,563,610 A | 10/1996 | Reudink | 342/375 |
| 5,565,873 A | 10/1996 | Dean | 342/372 |
| 5,576,659 A | 11/1996 | Kenington et al. | 330/52 |
| 5,579,016 A | 11/1996 | Wolcott et al. | 342/378 |
| 5,581,268 A * | 12/1996 | Hirshfield | 343/853 |
| 5,584,049 A | 12/1996 | Weaver, Jr. et al. | 455/67.1 |
| 5,588,020 A | 12/1996 | Schilling | 370/337 |
| 5,592,471 A | 1/1997 | Briskman | 455/52.3 |
| 5,596,329 A | 1/1997 | Searle et al. | 342/374 |
| 5,602,555 A | 2/1997 | Searle et al. | 342/374 |
| 5,602,834 A | 2/1997 | Dean et al. | 370/335 |
| 5,612,703 A | 3/1997 | Mallinckrodt | 342/457 |
| 5,642,353 A | 6/1997 | Roy, III et al. | 370/329 |
| 5,649,293 A | 7/1997 | Reed | 455/453 |
| 5,666,123 A | 9/1997 | Chrystie | 342/373 |
| 5,675,629 A | 10/1997 | Raffel et al. | 379/58 |
| 5,697,053 A | 12/1997 | Hanly | 455/33.1 |
| 5,703,874 A | 12/1997 | Schilling | 370/335 |
| 5,714,957 A | 2/1998 | Searle et al. | 342/374 |
| 5,715,516 A | 2/1998 | Howard et al. | 455/33.1 |
| 5,721,757 A | 2/1998 | Banh et al. | 375/345 |
| 5,758,090 A | 5/1998 | Doner | 395/200.66 |
| 5,777,579 A | 7/1998 | Goetz et al. | 342/373 |
| 5,784,031 A | 7/1998 | Weiss et al. | 342/373 |
| 5,798,675 A | 8/1998 | Drach | 333/161 |
| 5,815,116 A | 9/1998 | Dunbridge et al. | 342/373 |
| 5,841,395 A | 11/1998 | Simone | 342/196 |
| 5,848,358 A | 12/1998 | Forssen et al. | 455/437 |
| 5,856,810 A | 1/1999 | Lopez | 343/853 |
| 5,861,844 A | 1/1999 | Gilmore et al. | 342/374 |
| 5,872,548 A | 2/1999 | Lopez | 343/890 |
| 5,877,726 A * | 3/1999 | Kudoh et al. | 343/853 |
| 5,889,494 A | 3/1999 | Reudink et al. | 342/373 |
| 5,907,304 A | 5/1999 | Wilson et al. | 343/70 MS |
| 5,966,102 A * | 10/1999 | Runyon | 343/820 |

* cited by examiner

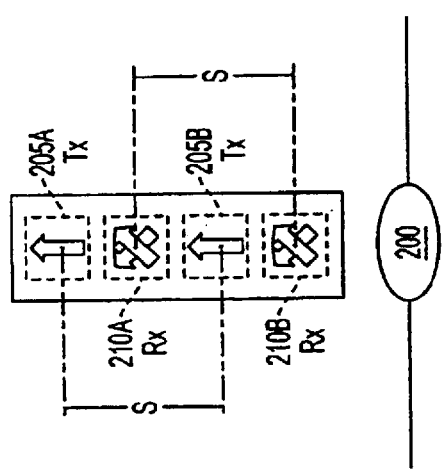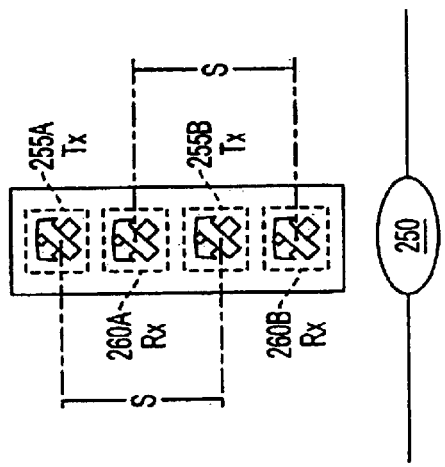

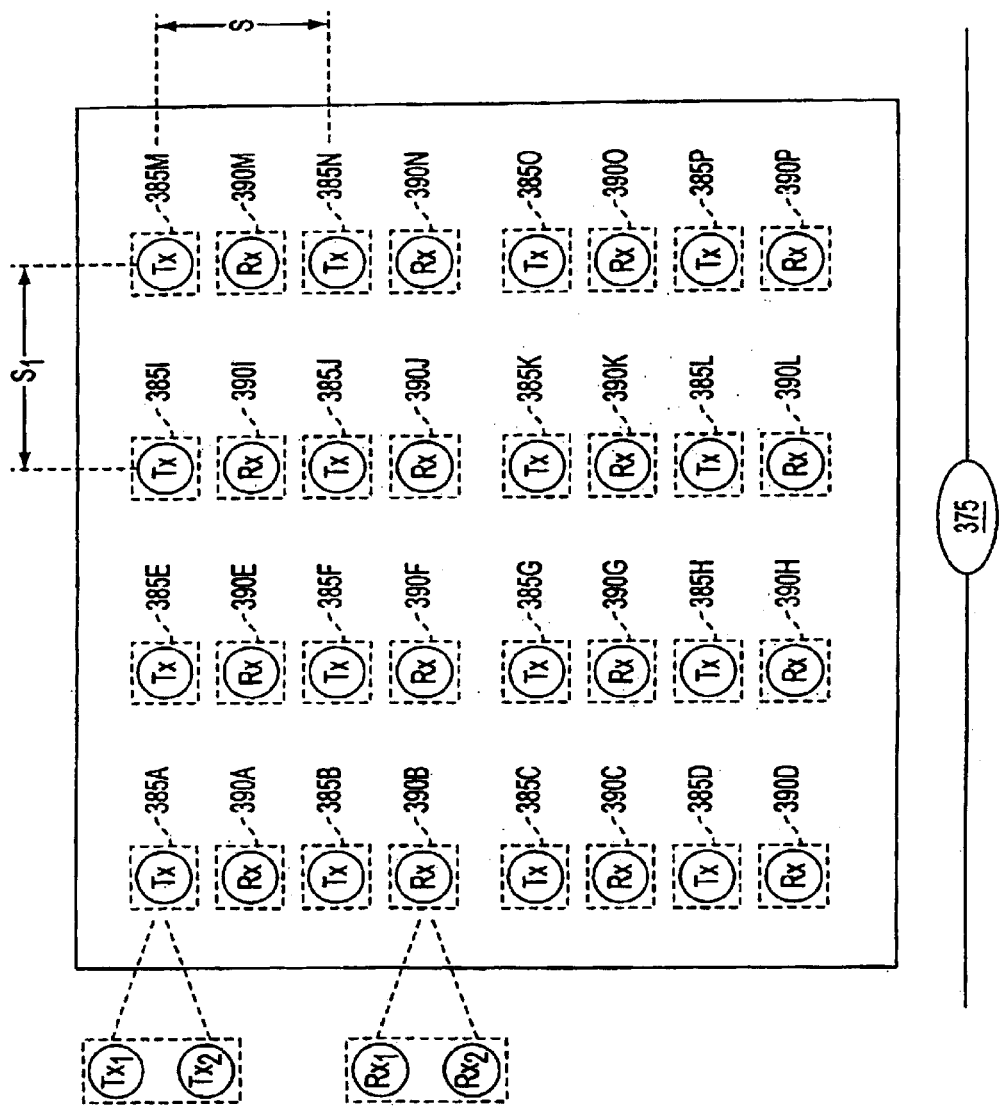

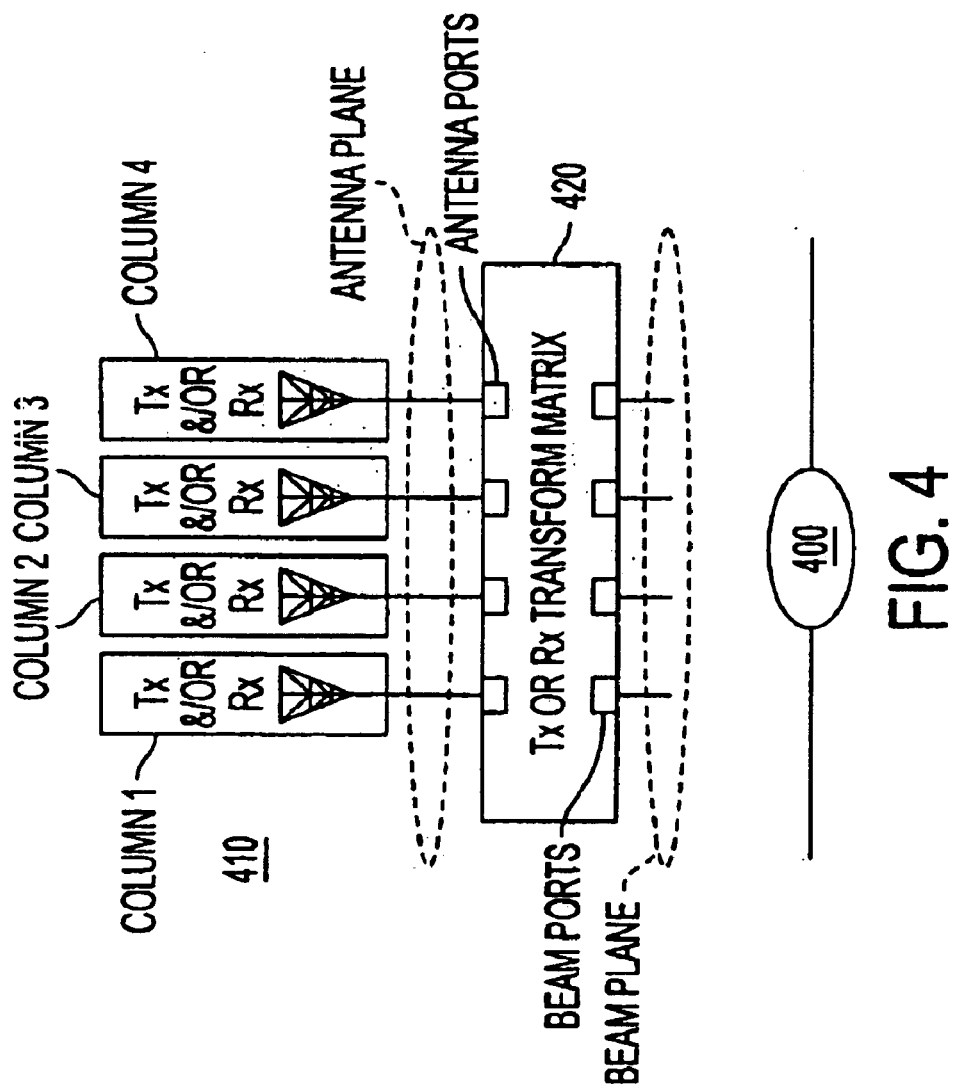

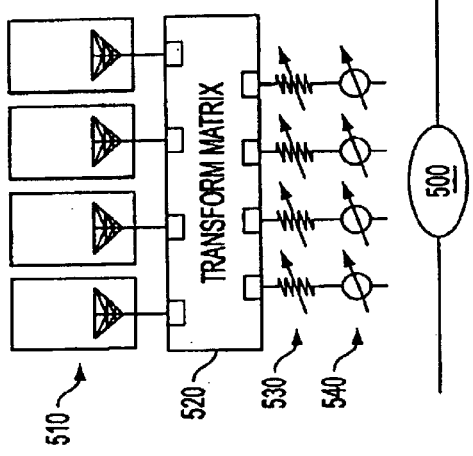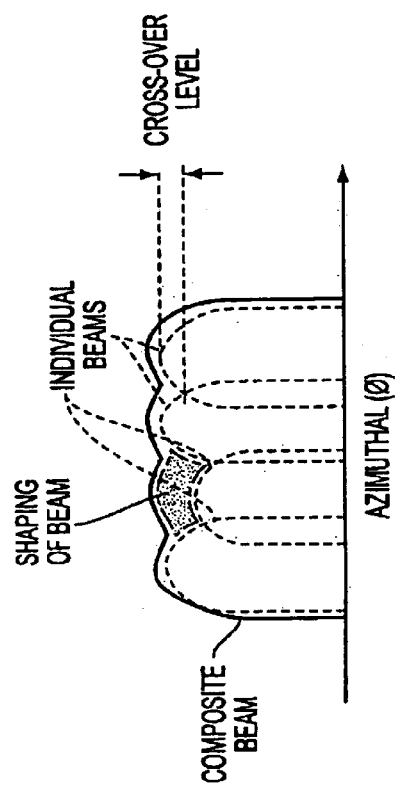

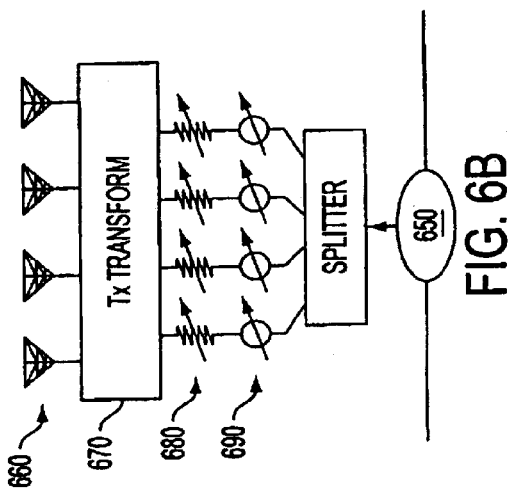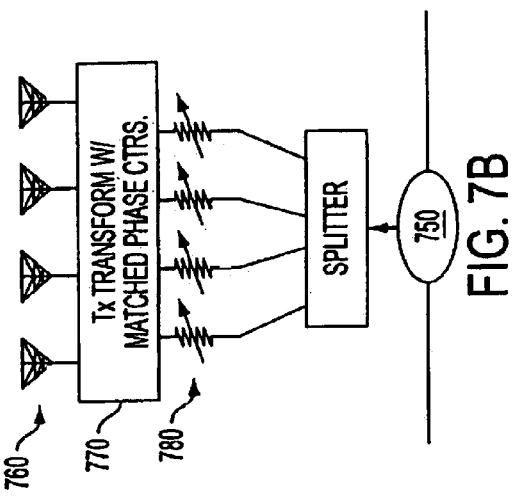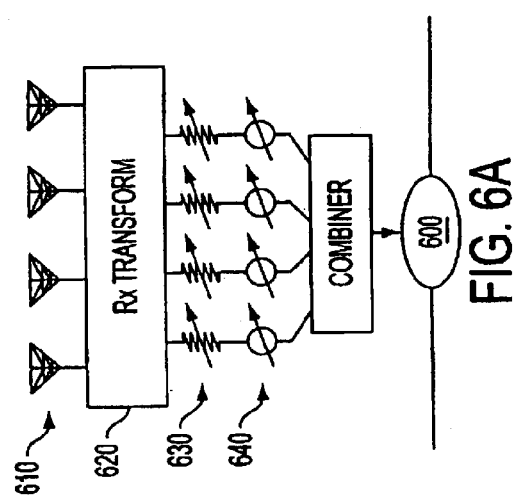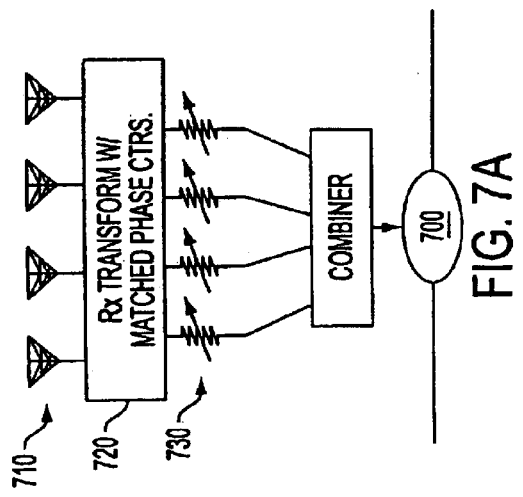

ACTIVE ANTENNA ARRAY CONFIGURATION AND CONTROL FOR CELLULAR COMMUNICATION SYSTEMS

RELATED APPLICATION DATA

This application is a continuation-in-part of the U.S. application Ser. No. 09/171,986, filed Oct. 30, 1998 now U.S. Pat. No. 6,697,641, which was the National Stage of International Application No. PCT/IL98/00104, filed Mar. 3, 1998, which claimed the benefit of (and accordingly, this application also claims the benefit of) each of Israeli Application Nos. 120364, filed Mar. 3, 1997, 120706, filed Apr. 20, 1997, and 121201, filed Jun. 30, 1997.

This application is also a continuation-in-part of the co-pending PCT International Application No. PCT/IL98/00103, filed Mar. 3, 1998, which claimed the benefit of (and accordingly, this application also claims the benefit of) each of Israeli Application Nos. 120364, filed Mar. 3, 1997, 120706, filed Apr. 20, 1997, and 121201, filed Jun. 30, 1997.

The present application is related to the disclosures provided in the U.S. application entitled "Scalable Cellular Communication System" filed (Ser. No. 09/357,845) on even date herewith in the names of Joseph Shapira and Gideon Argaman.

The contents of each and every one of the aforementioned applications are hereby expressly incorporated by reference herein in their entireties.

BACKGROUND OF THE INVENTION

Reservation of Copyright

The disclosure of this patent document contains material which is subject to copyright protection. The copyright owner has no objection to the fasimile reproduction by anyone of the patent document of the patent disclosure, as it appears in the U.S. Patent and Trademark Office patent files or records, but otherwise reserves all copyright rights whatsoever.

1. Field of the Invention

This invention generally relates to the field of cellular communications. More particularly, the present invention relates to an active antenna array configuration for cellular communication systems.

2. Description of Background Information

Today's cellular communication systems are subjected to ever-increasing user demands. Current subscribers are demanding more services and better quality while system capacities are being pushed to their limits. The challenge, therefore, is to provide feasible and practical alternatives that increase system capacity while achieving better grades of service.

Typically, for each geographic cell, cellular communication systems employ a base station (BS) with an omni-directional antenna that provides signal coverage throughout the cell. One way to increase the communications capacity, is to split the geographic cell into a plurality of smaller cells (i.e., cell-splitting) by deploying additional BSs within the cell, thereby increasing the number of frequencies that can be re-used by the system. This cell-splitting, however, can be both cost-prohibitive and environmentally-deterred as conventional BS equipment include antenna arrangements which are expensive and often too bulky and unaesthetic for prevailing community standards.

An alternative approach to improving system capacity and maintaining service quality is to angularly divide the geographic cells into sectors (i.e., sectorize) and deploy BS antennae that radiate highly-directive narrow beam patterns to cover designated sectors. The directive beam patterns can be narrow in both the azimuthal and elevation plane and, by virtue of their directional gain, enable mobile stations (MSs) to communicate with the BS at longer distances. In addition, system capacity increases as the sectorized cells are not as susceptible to interference from adjacent cells.

The narrow beams used to form beam patterns for given coverage areas are optimized to improve performance of the wireless network. An ideal goal is to provide exceptional service quality (e.g., no dropped calls), enhanced capacity, low per-site costs enabled by large coverage areas, and long battery service periods for MSs. There are various methods for optimizing the antenna arrangement. For example, wireless systems engineers have historically employed BS design rules regarding RF propagation-based coverage in order to "balance the link." This approach involves controlling the BS antenna gains and antenna heights for transmission and reception, BS transmit power levels, and BS receive sensitivity parameters. These different parameters are selected to provide approximately equal coverage for the MS-to-BS link (i.e., reverse link) as is provided for the BS-to-MS link (i.e., the forward link).

A need still exists to further lower costs of deployment and operations and to provide better coverage/capacity at lower costs. Accordingly, steps have been taken to introduce new technologies, such as CDMA technologies, for example, which can operate in environments involving high intra-system interference and yet provide exceptionally high capacity with low transmit power levels. These new environments and technologies require even more sophisticated network and design approaches and interference mitigation strategies.

As such, there exists a need for improvements in antenna systems and arrangements as well as systems for controlling antenna beam patterns in light of the above-identified issues.

SUMMARY OF THE INVENTION

The present invention is provided to improve upon wireless communication systems. Certain aspects of the present invention are presented which provide improvements to antenna arrangements in cellular wireless communication systems. Such improvements include the implementation of active transmit and receive antenna elements in specific configurations for cellular applications.

Another aspect of the present invention provides specific base station antenna systems and methods, and portions thereof, which improve and control specific characteristics and features of antenna systems including transmit and receive beam-shaping, polarization diversity processing, directional antenna controllers, etc.

In addition, a method for the optimization of a cellular communications network is provided which exploits reverse-link, forward-link, and pilot signal information to optimize the network operations.

BRIEF DESCRIPTION OF THE DRAWINGS

The above and other objects, features and advantages of the present invention are further described in the detailed description which follows, with reference to the drawings by way of non-limiting exemplary embodiments of the present invention, wherein like reference numerals represent similar parts of the present invention throughout the several views and wherein:

FIGS. 2A and 2B show different antenna arrangement units;

FIGS. 3B and 3C depicts other antenna arrangements;

FIG. 4 is a high level system diagram depicting an antenna arrangement and transform matrix;

FIG. 5A is a high level diagram illustrating a BS antenna system capable of shaping composite beams;

FIG. 5B is a high level diagram illustrating a shaped composite beam;

FIG. 6A is a high level diagram illustrating a receive portion of a BS antenna system;

FIG. 6B is a high level diagram illustrating a transmit portion of a BS antenna system;

FIG. 7A is a high level diagram illustrating a receive portion of a BS antenna system;

FIG. 7B is a high level diagram illustrating a transmit portion of a BS antenna system;

DETAILED DESCRIPTION OF THE EXEMPLARY EMBODIMENTS

Figure 1B:
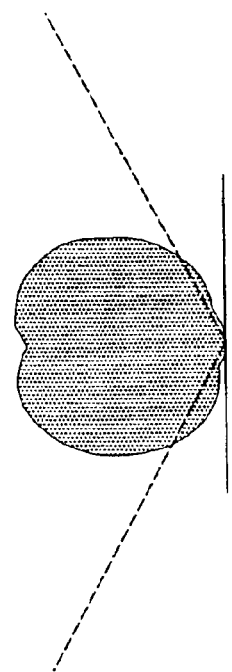
FIGS. 1B and 1C show beam patterns.
Figure 1C:
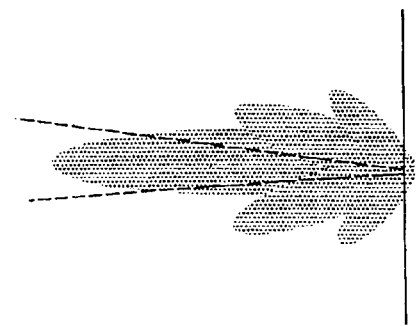
Figure 1A:
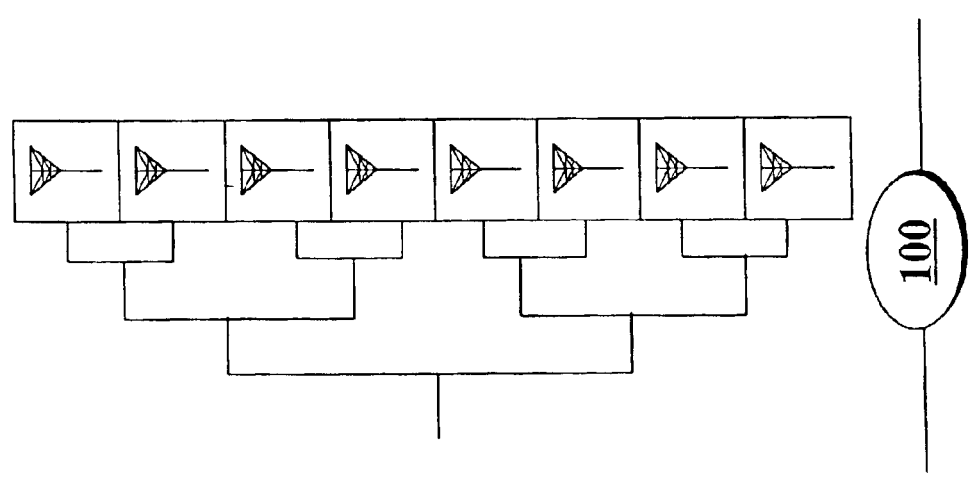
FIG. 1A is a high level diagram depicting a first type of antenna arrangement.

FIG. 1A depicts a conventional BS antenna array 100, having an 8×1 (columnar) arrangement. This antenna arrangement comprises either all transmit or all receive antenna elements. Such an antenna arrangement is capable of radiating highly directional beam patterns in either the elevation or azimuthal plane. Inputs to the array 100 are facilitated by a corporate feed, which interconnects the antenna elements.

FIGS. 1B, 1C illustrate different perspectives of a representative radiation beam pattern of a columnar antenna array, such as, antenna array 100, for example. FIG. 1B depicts the radiation beam pattern in the azimuthal plane while FIG. 1C depicts the pattern in the elevation plane. As can be seen from the FIG. 1C, the beam pattern is highly directive in the elevation plane.

FIG. 2A illustrates an active antenna array configuration for a BS. As depicted in FIG. 2A, antenna array 200 comprises a combination of 2 active transmit antenna elements 205A, 205B and 2 active receive antenna elements 210A, 210B, arranged in a single vertical (columnar) array. The 2 active transmit antenna elements 205A, 205B and 2 active receive antenna elements 210A, 210B, are preferably printed elemental radiators having a multi-layer configuration & sealed by an epoxy-fiberglass radome.

By incorporating separate transmit antenna elements 205A, 205B and receive antenna elements 210A, 210B within a single array, the BS is capable of achieving full transmission and reception functionality for cellular operations while eliminating the need for independent transmission and reception antenna arrays, as depicted in FIG. 1. In doing so, antenna array 200 achieves full BS functionality in a streamlined and compact design.

The spatial separation of the transmit 205A, 205B and receive antenna elements 210A, 210B within the array also avoids the intermodulation interference on the receive portion caused by the high power transmit signals, as stated above with respect to conventional combined-element systems. The spatial separation also provides flexibility in BS transmission and reception optimization schemes, such as, for example, independent gain control and beam-shaping, which is limited in combined-element systems. In addition, the separation also obviates the need for signal discriminating hardware, such as duplexers and complex transmit and receive filters which, in attempting to isolate and filter the respective signals from combined transmit/receive antenna elements, operate in a relatively lossy and inefficient manner. Such spatial separation also results in additional isolation between the receive and transmit signals.

FIG. 2A further illustrates that, within the vertical arrangement, the antenna elements are disposed in an alternating fashion such that a first transmit antenna element 205A is followed by a first receive antenna element 210A and a second transmit antenna element 205B is followed by a second antenna element 210B. The interleaving of the transmit 205A, 205B and receive antenna elements 210A, 210B within the array enables the optimal vertical separation distance S to be established. Optimal vertical separation distance S is the vertical distance between like antenna elements which, for a given frequency, maximizes the main lobe gain of a signal while minimizing the contribution of minor lobes. The optimal vertical separation distance S can vary. For example, in PCS, S may be from $0.70\lambda$ to $0.95\lambda$.

Additionally, the transmit 205A, 205B and receive antenna elements 210A, 210B within the array antenna are configured to produce polarized radiated patterns. Artisans of ordinary skill in the art will readily appreciate that polarization of a radiated pattern in a specified direction results in the maximum gain of the pattern along the specified direction. Because antennas in permanently-installed MSs (i.e., units hard-wired in vehicles) are vertically polarized, the most suitable polarization for the pattern radiated by the BS transmit antenna elements 205A, 205B, is vertical polarization.

Because of multipath considerations, coupled with the relatively low transmit power of MSs, each of receive antenna elements 210A, 210B comprises a pair of orthogonally polarized receive antenna elements, and is thus equipped with receive polarization diversity. Polarization diversity typically requires two antenna elements that are orthogonally polarized. The effectiveness of receive polarization diversity depends on the similarity of the radiated patterns received by the two antenna elements and on the equality of the average signal level received by the elements. For example, a hand-held MS's transmit antenna is linearly polarized and the polarization is randomly distributed depending upon the position in which the MS is held. As such, antenna array 200 exploits these polarization states by configuring each of the receive antenna elements 210A, 210B to accommodate two opposing linearly-slanted polarized states (i.e., ±45° linear polarization).

It is to be understood that the specific arrangement of antenna array 200 may be modified to provide redundancy or otherwise enhance the attributes and characteristics of the array configuration. For example, antenna array 200 may be augmented by stacking combinations of the array to achieve antenna elements arranged in an 8×1, 12×1, or 16×1 array configuration.

FIG. 2A, therefore, illustrates a compact single-column array antenna configuration for cellular communications having full transmission and reception capabilities. The configuration enables independent transmit and receive gain control and beam-shaping, minimizes transmit intermodulation interference, and provides receive polarization diversity.

FIG. 2B illustrates another active antenna array configuration for a BS. As depicted in FIG. 2B, antenna array 250 comprises a combination of 2 active transmit antenna elements 255A, 255B and 2 active receive antenna elements 260A, 260B, arranged in a single vertical (columnar) array. As stated above with respect to the first embodiment, by virtue of spatially separating the transmit antenna elements 255A, 255B from the receive antenna elements 260A, 260B, antenna array 250 achieves full BS transmission and reception functionality while obviating transmit intermodulation effects on the receive portion. Much like antenna array 200, antenna array 250 also provides the flexibility of independent gain control and beam-shaping for both BS transmission and reception as well as establishing the optimal separation distance S between like antenna elements.

Antenna array 250 also provides the additional benefit that it is configured to provide polarization diversity for both the BS transmit antenna elements 255A, 255B and the BS receive antenna elements 260A, 260B. As stated above, because of the manner in which a handheld MS operates, the polarization of a corresponding MS receive antenna is randomly distributed. As depicted in FIG. 2, antenna array 250 exploits these polarization states by configuring each of the BS transmit antenna elements 255A, 255B and each of the receive antenna elements 260A, 260B to accommodate two opposing linearly-slanted polarized states (i.e., ±45° linear polarization).

It is to be understood that the specific arrangement of antenna array 250 may be modified to provide redundancy or otherwise enhance the attributes and characteristics of the array configuration. For example, antenna array 250 may be augmented by stacking combinations of the array to achieve antenna elements arranged in an 8×1, 12×1, or 16×1 array configuration array configuration. This arrangement, therefore, provides a compact single-column array antenna configuration for cellular communications having full transmission and reception capabilities. The configuration enables independent transmit and receive gain control and beam-shaping, minimizes transmit intermodulation interference, and provides both transmit and receive polarization diversity.

Figure 3B:
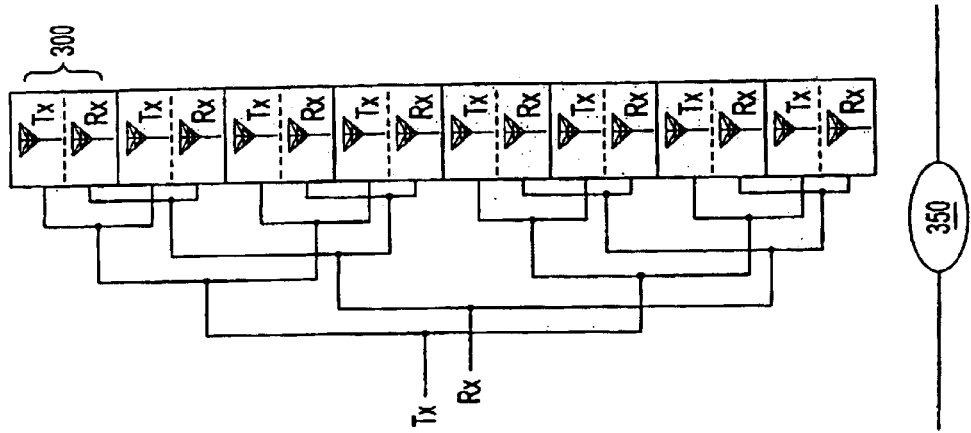
Figure 3A:
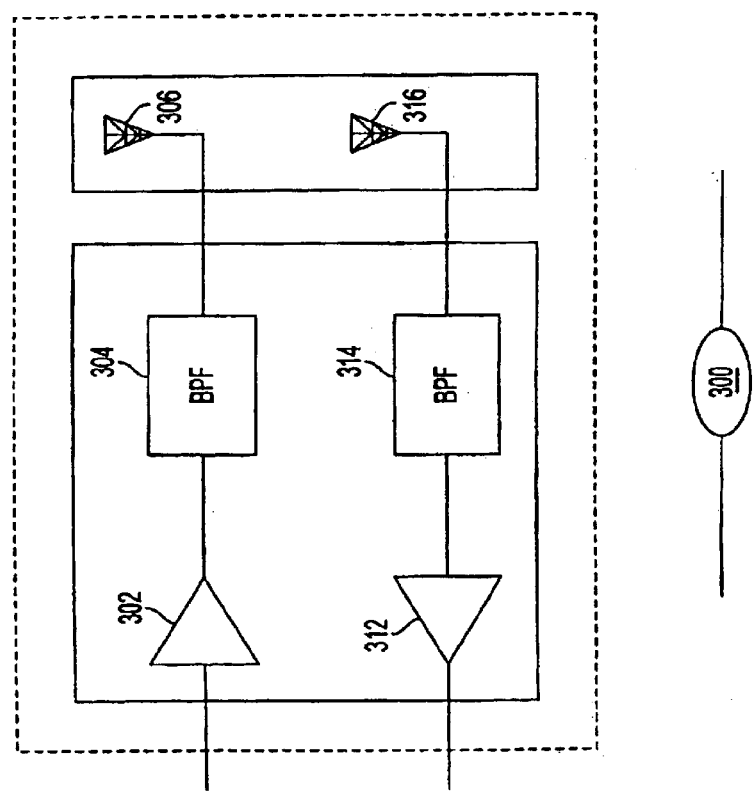
FIG. 3A shows an active radiator unit.

FIG. 3A depicts a representative embodiment of an Active Radiating Unit (ARU) 300, which is described in the commonly-assigned application entitled "SCALABLE CELLULAR COMMUNICATIONS SYSTEM", filed on even date herewith in the name of Dr. Joseph Shapira and which is herein incorporated by reference. The ARU 300 comprises a modular antenna unit having a transmit path and a receive path. The transmit path incorporates a power amplifier (PA) 302 which is electrically coupled to a transmit band-pass filter 304. The transmit filter 304 is, in turn, electrically coupled to a transmit antenna 306. The transmit antenna 306 may be configured for a variety of operations, including, for example, vertical or dual slanted-linear polarization, as indicated above in antenna arrays 200, 250. Similarly, the receive path implements a receive antenna 316 which is electrically coupled to a receive bandpass filter 314. The receive antenna 316 may also be configured for a variety of operations, including, for example, vertical or dual slanted-linear polarization, as indicated above in antenna arrays 200, 250. The receive bandpass filter 314 is subsequently coupled to a low-noise amplifier (LNA) 312. The ARU 300 may also include monitoring and control sub-units as well as power conditioning sub-units in order to provide supervisory control, management functionality, and optimal performance. As such, the ARU 300, therefore provides transmission and reception path portions within a single modular unit.

FIG. 3B illustrates antenna array 350, deploying a plurality of ARUs 300 in an 8×1 (columnar) arrangement. Inputs to the array 350 are facilitated by two corporate feeds, which respectively interconnect all the transmit antenna elements and all the receive antenna elements. As stated above with respect to ARU 300, the transmit elements may be vertically polarized and the receive antenna elements may be linearly-slant polarized (i.e., ±45° linear polarization). Alternatively, antenna array 350 may be configured to have transmit and receive polarization diversity by configuring both the transmit antenna elements and the receive antenna elements to have linearly-slant polarization.

FIG. 3C illustrates a third active antenna array configuration for a BS. As depicted in FIG. 3C, antenna array 375 comprises a combination of 16 active transmit antenna elements 385A–385P and 16 active receive antenna elements 390A–390P, arranged in a multi-columnar array. As stated above with respect to the other disclosed embodiments, by incorporating transmit antenna elements 385A–385P and receive antenna elements 390A–390P within the array and by spatially separating the transmit antenna elements 385A–385P from the receive antenna elements 390A–390P, antenna array 375 achieves full BS transmission and reception functionality while obviating transmit intermodulation effects on the receive portion. Antenna array 375 also provides the flexibility of independent gain control and beam-shaping for both BS transmission and reception. Because of its unique two-dimensional configuration, array 375 facilities the optimal and near-optimal vertical separation distances S and horizontal separation distances $S_1$ between like antenna elements.

Antenna array 375 may be coupled to bear shaping circuitry to provide a plurality of narrow beam patterns. Narrower beams are more directional than their wider counterparts. Such directivity arises from higher gains in predetermined directions which yields an improvement in range and makes the beam patterns less susceptible to interference. Thus, MSs, operating under the same power constraints, can communicate with the BS over longer distances.

For the reasons stated above with respect to other embodiments, the transmit elements 385A–385P of antenna array 375 may be vertically polarized and the receive antenna elements 390A–390P may be linearly-slant polarized (i.e., ±45° linear polarization). It is to be noted that, similar to the previously-identified configurations, antenna array 375 may achieve transmit and receive polarization diversity by configuring both transmit antenna elements 385A–385P and receive antenna elements 390A–390P to be linearly-slant polarized.

It is to be understood that the specific 8×4 arrangement of antenna array 375 may be modified to provide redundancy or otherwise customize the attributes and characteristics of the array configuration. For example, antenna array 375 may be augmented by stacking combinations of the array to achieve antenna elements arranged in an 16×4 or 8×8 array configuration.

FIG. 4 illustrates a generic implementation of a BS antenna system 400 comprising a multi-columnar antenna arrangement 410 coupled to a transform matrix 420. As illustrated in FIG. 4, the antenna arrangement 410 and the transform matrix 420 are configured for either transmit or receive BS operations. The transform matrix 420 comprises a plurality of beam ports on a beam-plane side of the matrix 420 and a plurality of antenna ports of the antenna-plane side of the matrix. Each column array of the multi-columnar array arrangement 410 is coupled through the matrix 420 to the beam ports. During BS system 400 transmission, this configuration enables the transform matrix 420 to receive signals, which include relative amplitude and phase information, from the beam-plane ports. Based on this information, the matrix 420 transforms the beam-plane signals into signals appropriate for the radiating antenna elements and delivers such signals to all the antenna ports. The antenna elements within the columns of multi-column array 410, then radiate a narrow beam patterns in different directions in accordance with the transformed signals. Conversely, during BS system 400 reception, the transform matrix 420 receives signals from the antenna-plane ports and transforms them into signals appropriate for processing. As such, the illustrated system 400 forms a plurality of narrow beam patterns that span different angular directions for a given axis. In the illustration, each beam port is associated with one of those beam patterns.

FIG. 5A illustrates a BS antenna system 500 comprising a multi-columnar antenna arrangement 510 coupled to a transform matrix 520. As illustrated in FIG. 5A, each of the beam ports on the beam-plane side of the transform matrix 520 is coupled to an amplitude or gain adjusting element 530 and a phase adjusting element 540. Elements 530, 540 allow for amplitude/gain and phase adjustments to be made in order to control the shape of the antenna beam patterns, as indicated in FIG. 5B.

FIG. 5B illustrates a typical composite beam pattern radiated by a BS system, such as BS antenna system 500 depicted in FIG. 5A. The transform matrix 520 supplies signals to the antenna ports which enables the antenna elements to form four individual beams. The aggregate effect of these individual beams is the envelope composite beam, as indicated in FIG. 5B. As stated above, amplitude/gain adjusting elements 530 and phase adjusting elements 540 make it possible to control the shape of the antenna beam patterns. The amplitude level at which the individual beams (i.e., sub-beams) intersect is called the cross-over level. The position of the cross-over level depends, at least in part, on the optimal separation distance of the antenna elements contained in the antenna array 510.

FIG. 6A illustrates a receive portion of a BS antenna system 600 comprising a multi-columnar receive antenna arrangement 610 coupled to a receive transform matrix 620. Each of the beam ports on the beam-plane side of the receive transform matrix 620 is coupled to an amplitude/gain adjusting element 630 and a phase adjusting element 640. Similarly, FIG. 6B depicts a transmit portion of a BS antenna system 650 comprising a multi-columnar transmit antenna arrangement 660 coupled to a transmit transform matrix 670. Each of the beam ports on the beam-plane side of the transmit transform matrix 670 is coupled to the amplitude/gain adjusting element 680 and a phase adjusting element 690.

FIG. 7A depicts a receive portion of a BS antenna system 700 comprising a receive transform matrix 720 with matching phase center capability. This capability enables the transform matrix to generate beam patterns with identical phase centers. As such, phase adjustment elements external to the transform matrix 720 are not provided. Amplitude/gain adjustments are accomplished through the amplitude/gain adjusting elements 730 which are coupled to the beam ports. Similarly, FIG. 7B depicts a representative embodiment for the transmit portion of a BS antenna system 750, comprising an antenna arrangement a Tx transform matrix with matched phase centers, amplitude/gain adjusters 780, and a splitter.

Figure 8:
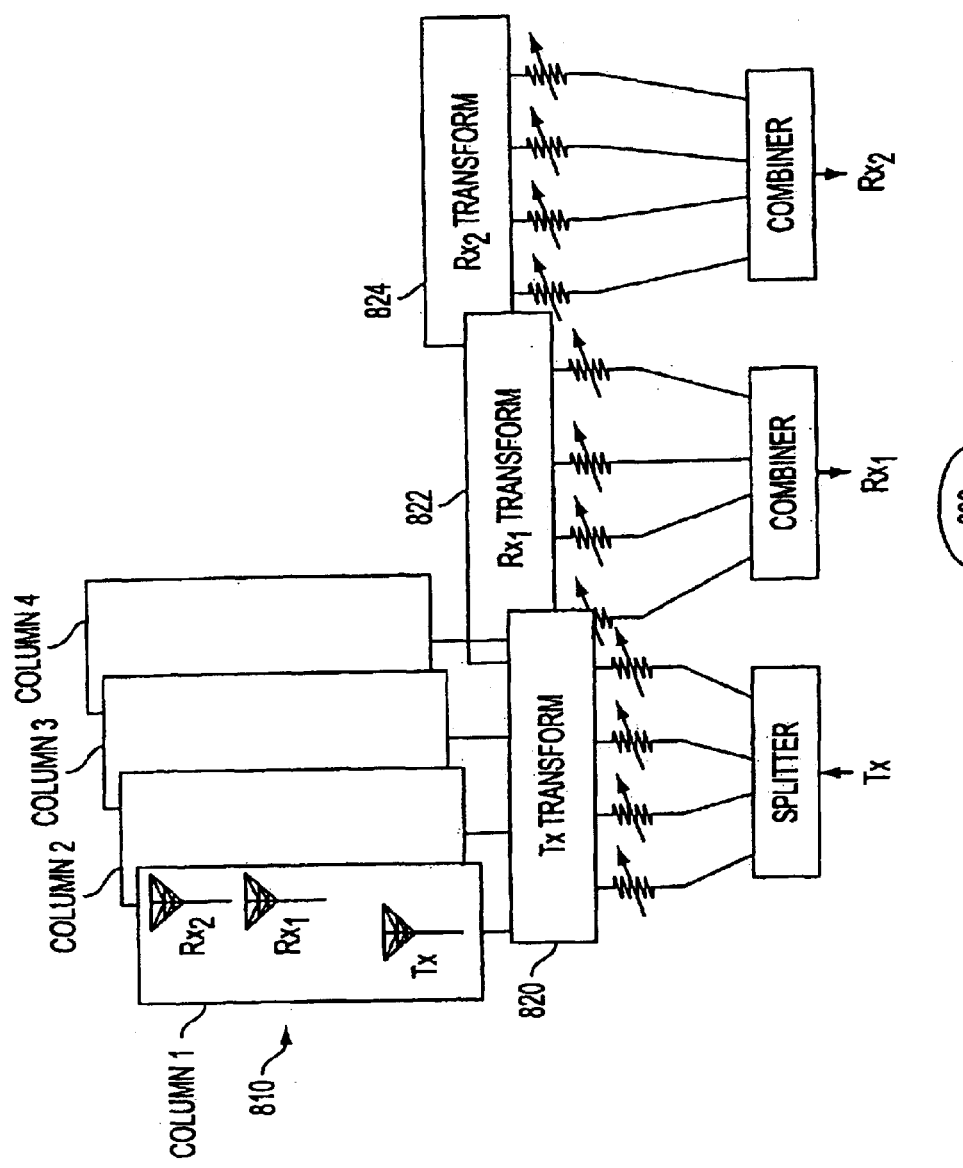
FIG. 8 is a high level diagram depicting a BS antenna system.

FIG. 8 illustrates a BS antenna system 800 comprising a multi-columnar antenna arrangement 810 coupled to a transmit transform matrix 820 and receive transform matrices 822, 824, respectively. The multi-columnar antenna arrangement 810 includes one or more transmit-receive antenna sets; each set includes two receive antenna elements and a single transmit antenna element. The illustrated arrangement is used to achieve polarization diversity on the receive portion of the system 800. It is to be noted that other antenna arrangements may be provided for, such as two transmit and two receive antenna elements per transmit-receive antenna set, or multiples thereof, for example, to achieve diversity on both the transmit and receive portions. Each of the transmit and receive antenna elements within the columns of the array arrangement 810 are associated with the antenna ports corresponding to the respective transmit 820 and receive matrices 822, 824. Each polarization state for the receive portion is routed to its own dedicated transform matrix 822, 824, having its own separate host of amplitude/gain adjustments. As such, each polarization state can be controlled separately for each radiated beam pattern.

Figure 9B:
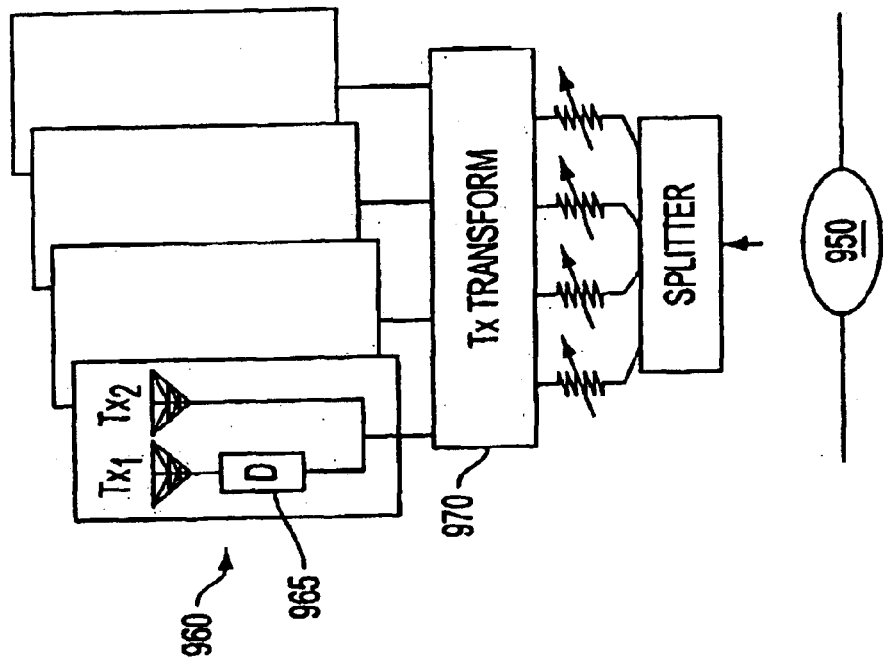
FIG. 9B is a high level diagram illustrating a transmit portion of a BS antenna system.
Figure 9A:
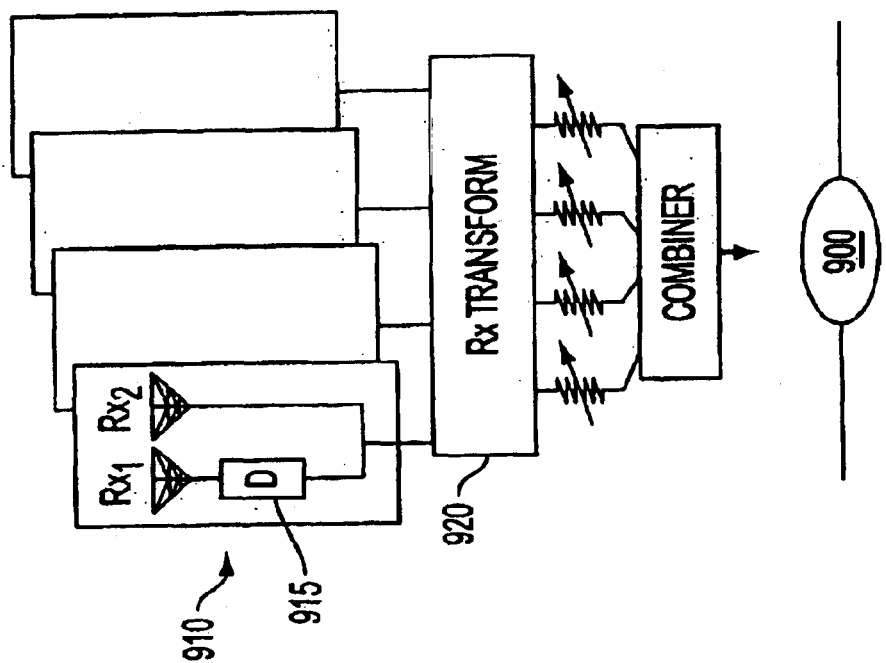
FIG. 9A is a high level diagram illustrating a receive portion of a BS antenna system.

FIG. 9A illustrates a receive portion of a BS antenna system 900 comprising a multi-columnar antenna arrangement 910 coupled to a receive transform matrix 920. The multi-columnar arrangement 910 includes a delay unit 911 between two polarization-diverse receive antenna elements within each column. The delay unit, as implemented, provides a delay between the two receive polarization states. These two states are then transformed by a single receive transform matrix 920 with amplitude/gain adjustment elements on the beam port side. By virtue of the delay between polarization states, this configuration allows the BS to distinguish between the Rx signals received over receive antennas of different polarizations, without requiring separate antenna ports and Rx transform matrices for differently polarized receive antenna elements. FIG. 9B illustrates a transmit portion of a BS antenna system 950, which is the transmit analog of system 900, and which comprises antenna arrangements 960, delay elements 965, a transmit transform matrix 970, and a splitter.

Figure 10A:
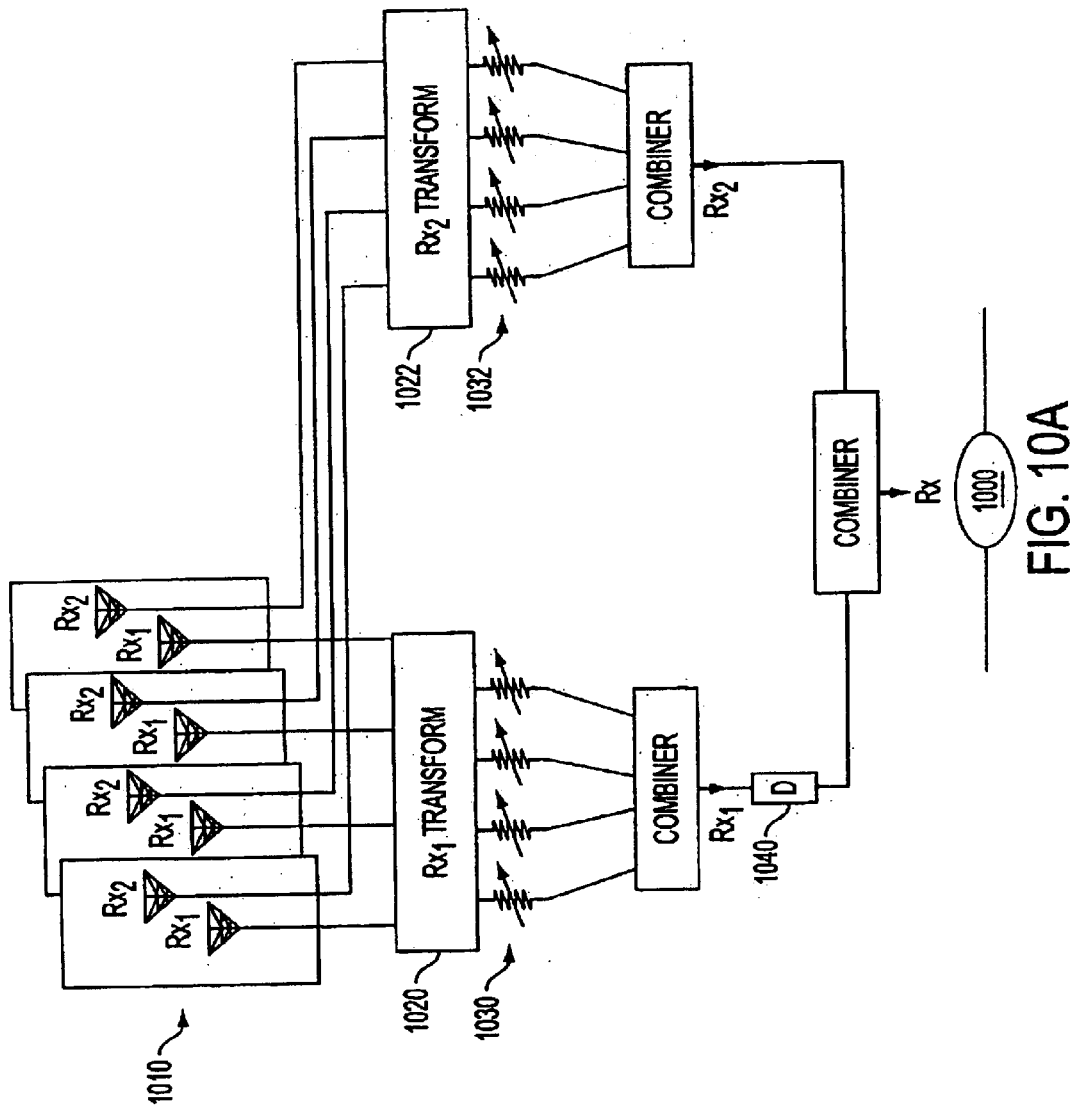
FIG. 10A is a high level diagram illustrating a receive portion of a BS antenna system.
Figure 10B:
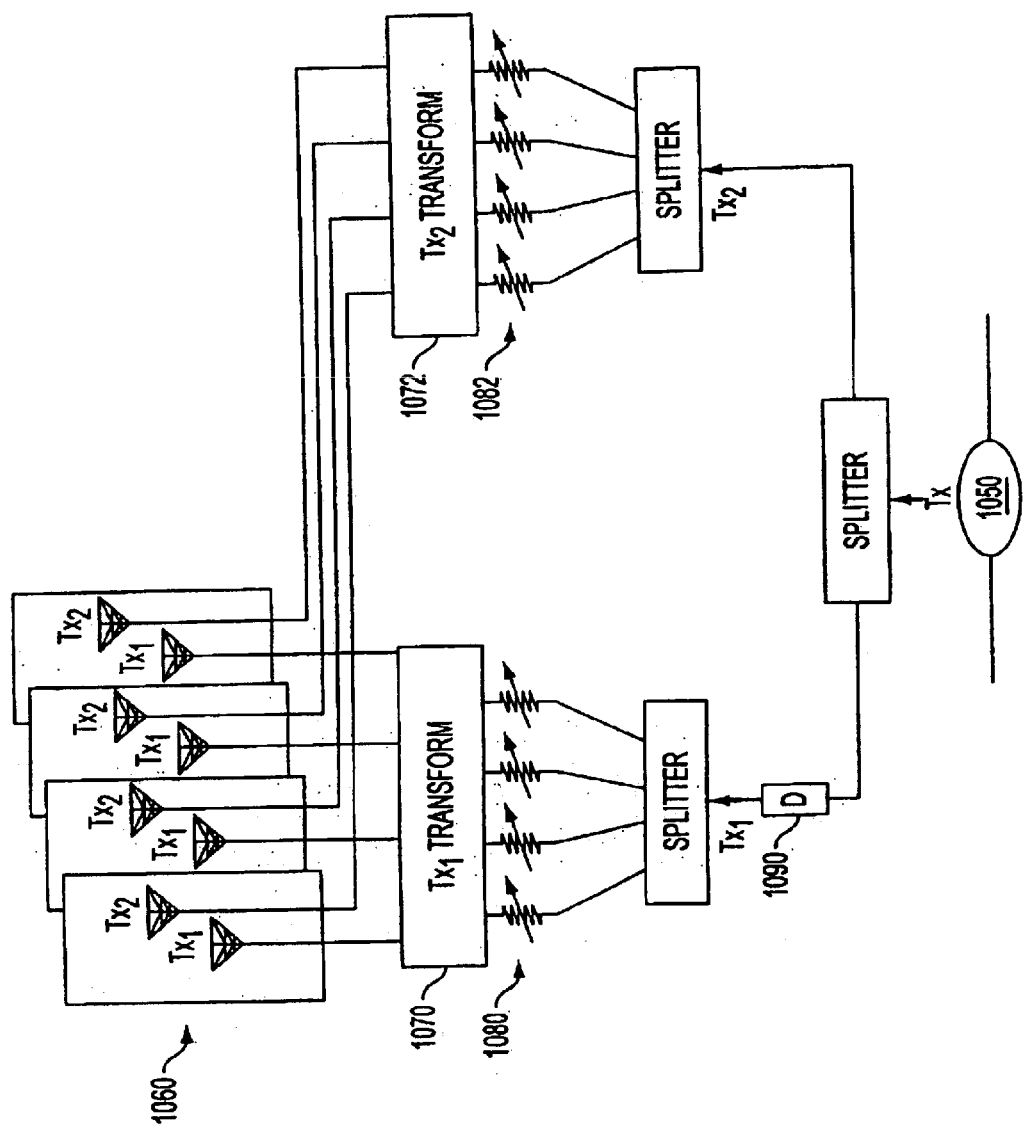
FIG. 10B is a high level diagram illustrating a transmit portion of a BS antenna system.

FIG. 10A illustrates a receive portion of BS antenna system 1000 comprising a multi-columnar antenna arrangement 1010 coupled to receive transform matrices 1020, 1022. The multi-columnar arrangement 1010 includes a set of polarization-diverse receive antenna element pairs within each column, and separately polarized receive antenna elements within each set are fed to each respective transform matrices 1020, 1022. On the beam ports, two sets of amplitude/gain attenuation adjustments 1030, 1032 are incorporated, and the beam port signals are respectively combined to form two polarized receive beam patterns. A delay 1040 is introduced into one of the polarized beam patterns, the result of which is combined with the other polarized beam pattern to form a single composite beam pattern. Such a configuration provides an additional degree of controlling polarization diversity in a multi-beam environment. It is to be noted that, generally, the configurations depicted by FIGS. 9A and 10A would generate dissimilar antenna patterns. However, both configurations could be adjusted to generate identical beam patterns. FIG. 10B illustrates a transmit portion of a BS antenna system 1050, which is the transmit analog of system 1000, and which comprises antenna arrangements 1060, transform matrices 1070, 1072, amplitude adjusters 1080, 1082, splitters, and time delay element 1090.

Figure 11A:
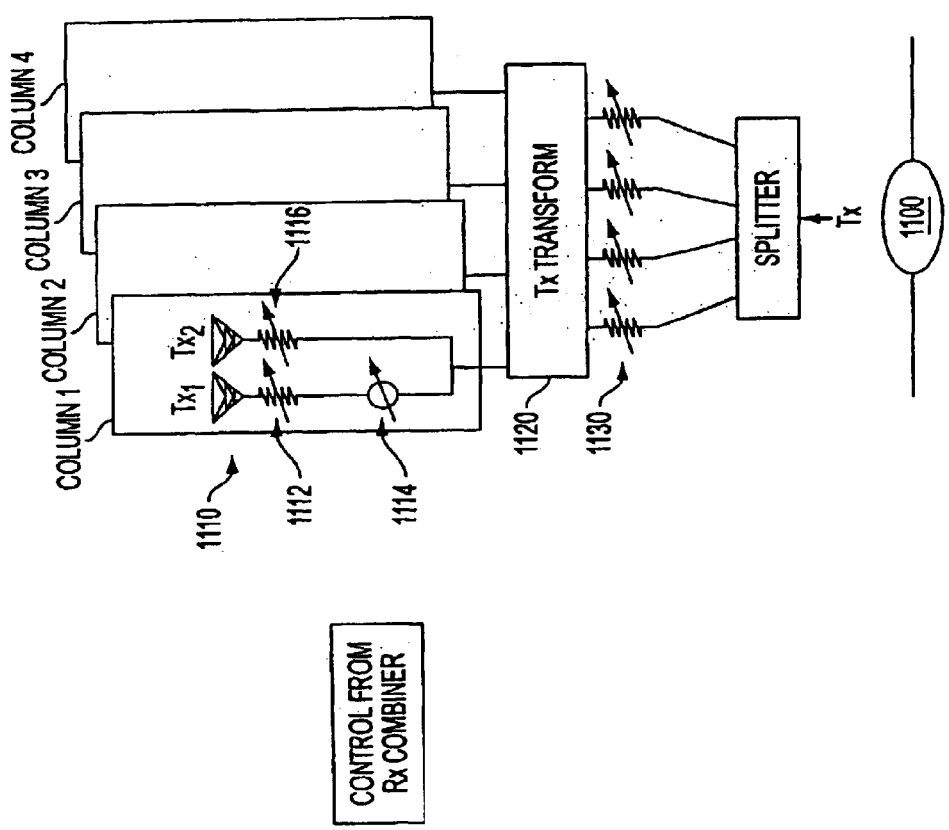
FIG. 11A is a high level diagram depicting a transmit portion of a BS antenna system.

FIG. 11A illustrates a transmit portion of a BS antenna system 1100 comprising a multi-columnar antenna arrangement 1110 coupled to a transmit transform matrix 1120. Within each column of the multi-columnar antenna arrangement 1110, there exists an amplitude/gain adjustment element 1112 and phase adjustment element 1114 on a set of polarized transmit antenna elements and an amplitude/gain adjustment element 1116 on another set of polarized transmit antenna elements. These adjustments enable the variance of certain characteristics, based on the polarization of the transmit beam patterns. These two polarization states are then transformed by a single transmit transform matrix 1120. As such, this configuration affords two degrees of control by controlling the beam pattern on a column basis as well as controlling beam patterns on a sector basis (i.e., angular sectorized portion of a cell).

Figure 11B:
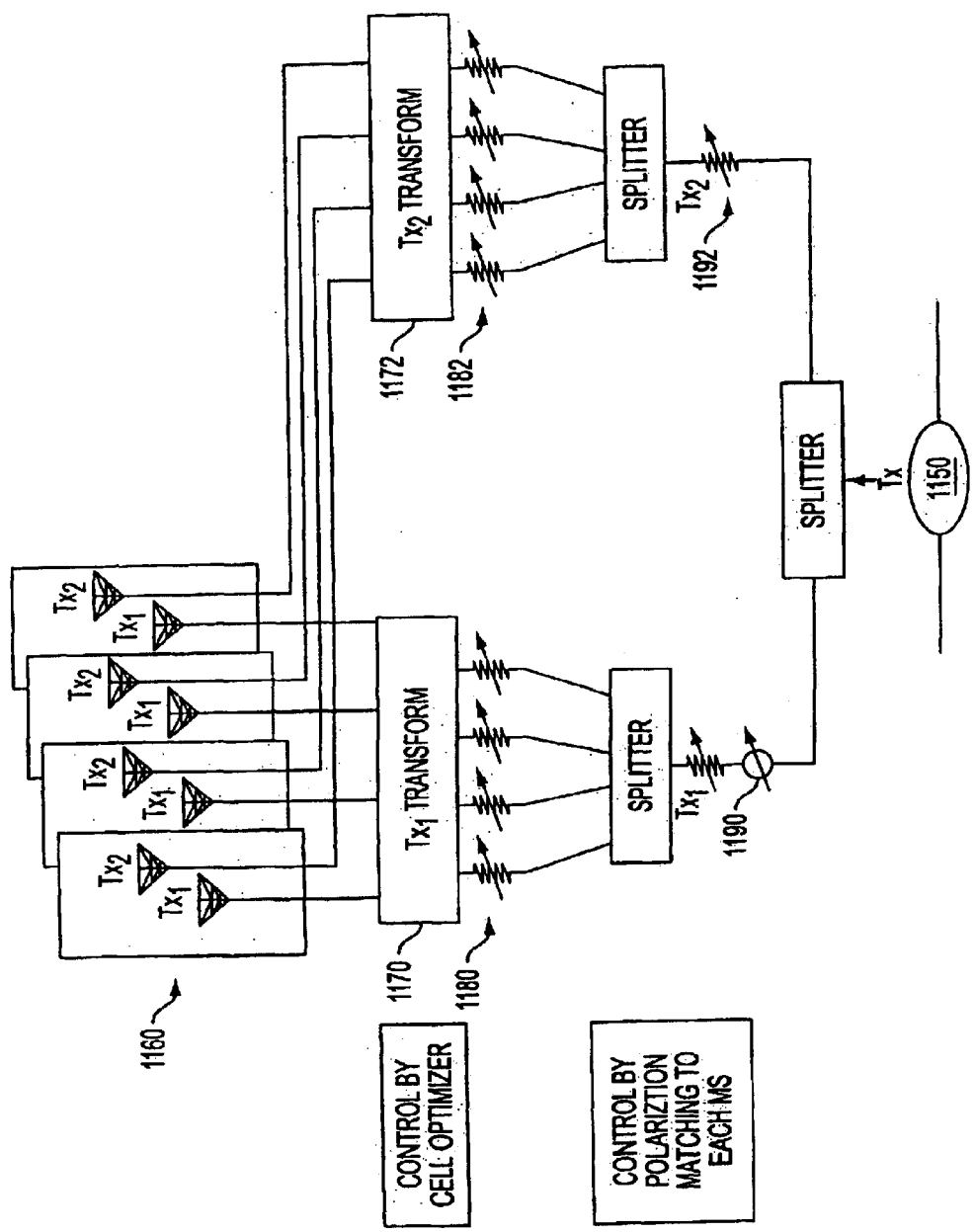
FIG. 11B is a high level diagram depicting a transmit portion of a BS antenna system.

FIG. 11B illustrates a transmit portion of a BS antenna system 1150 comprising a multi-columnar antenna arrangement 1160 coupled to transmit transform matrices 1170, 1172. At each antenna port, a transmit signal is split to create two polarized signals. One polarized signal is amplitude/gain and phase adjusted 1190 while the other polarized signal is amplitude/gain adjusted 1192. Each respective adjusted polarized signal is then respectively split again and subsequently amplitude/gain adjusted 1180, 1182, before being applied to separate transform matrices 1170, 1172. The transform matrices 1170, 1172 then transform these signals and supply them to the multi-columnar antenna arrangement 1160 which includes pairs of polarization-diverse transmit antenna elements within each column. Such a configuration enables BS transmit antenna system 1150 to achieve polarization matching while affording two degrees of control, namely adjustments 1190, 1192 to match the polarization of MSs and adjustments to optimize beam patterns 1180, 1182.

Figure 12A:
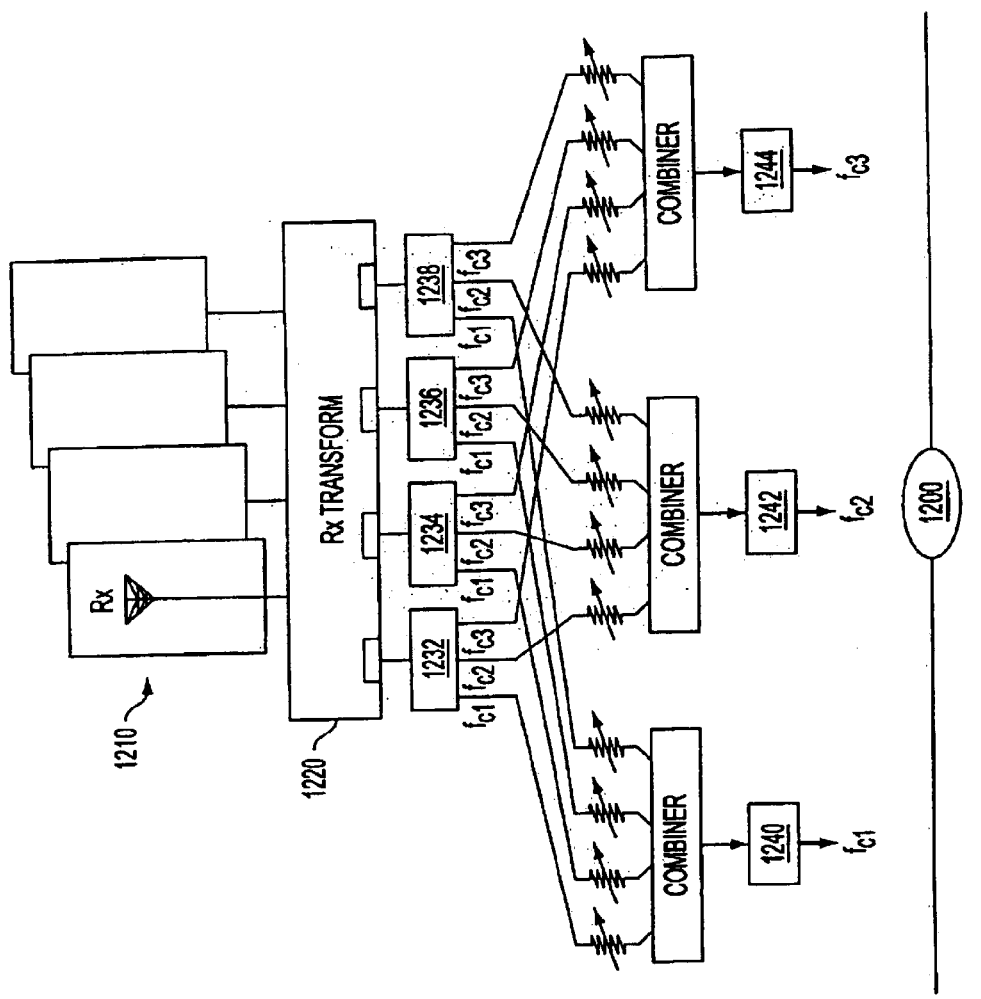
FIG. 12A is a high level diagram depicting a multi-carrier receive portion of a BS antenna system.
Figure 12B:
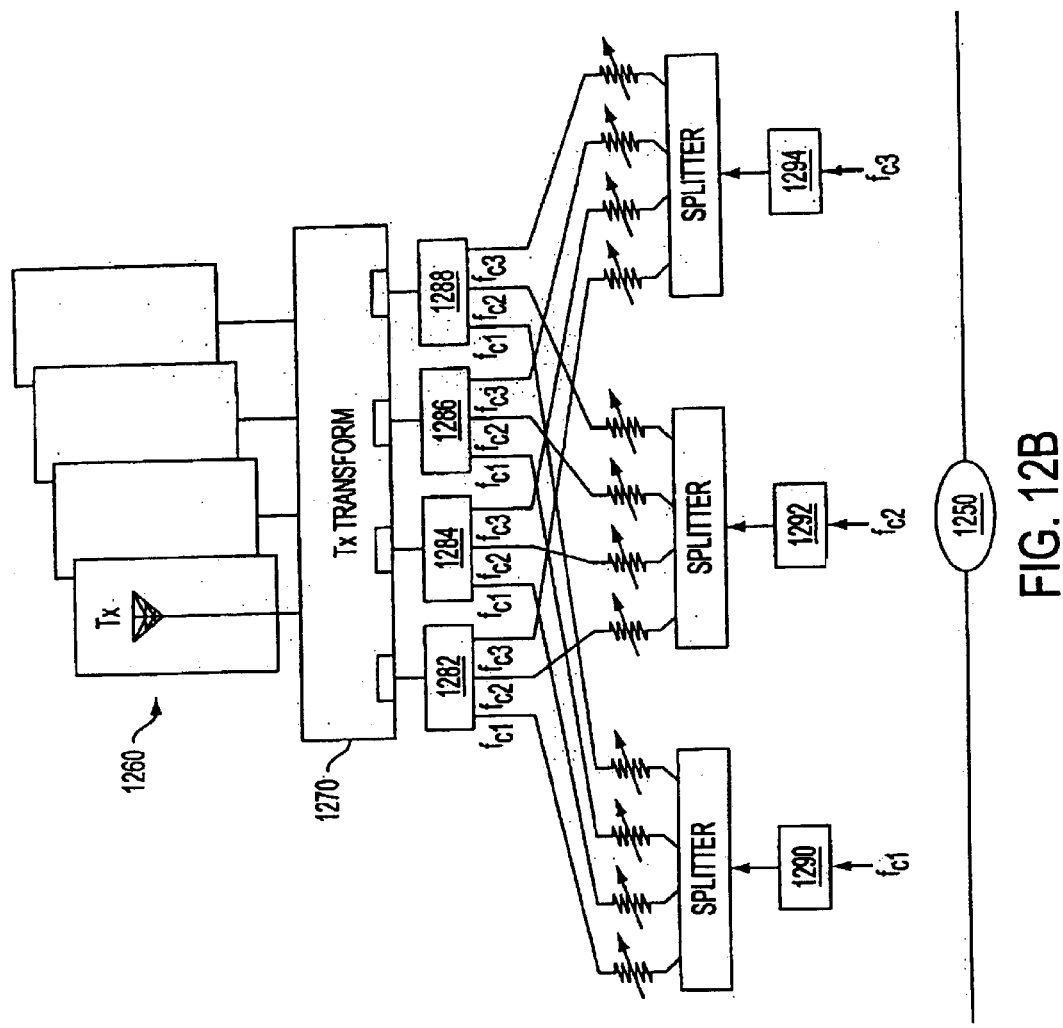
FIG. 12B is a high level diagram depicting a multi-carrier receive portion of a BS antenna system.

FIG. 12A depicts a receive portion of BS antenna system 1200 configured for multi-frequency allocation (i.e., multi-carrier) operation. The BS receive system 1200 comprises a multi-columnar antenna arrangement 1210 coupled to a receive transform matrix 1220. The respective receive signals appearing at each of the beam ports of the receive transform matrix 1220 are divided into their carrier frequency components. This is accomplished by devices 1232, 1234, 1236, 1238 which split each beam port signal into separate frequency branches, each branch corresponding to a respective carrier frequency. For example, in FIG. 12 there exists three carrier frequencies, $fc_1$, $fc_2$, and $fc_3$. Each frequency branch for each of the beam port signals is then amplitude/gain adjusted and combined. The combined signal is then routed to a channel filter 1240, 1242, 1244 tuned to the respective carrier frequency. This configuration, therefore, provides the capability of controlling the beam pattern for each carrier frequency utilizing a single a multi-columnar antenna arrangement 1910. Moreover, as indicated by FIG. 12B, this configuration may also be implemented for a transmit portion of BS antenna system 1250, arranged for multi-frequency allocation operation.

Figure 13:
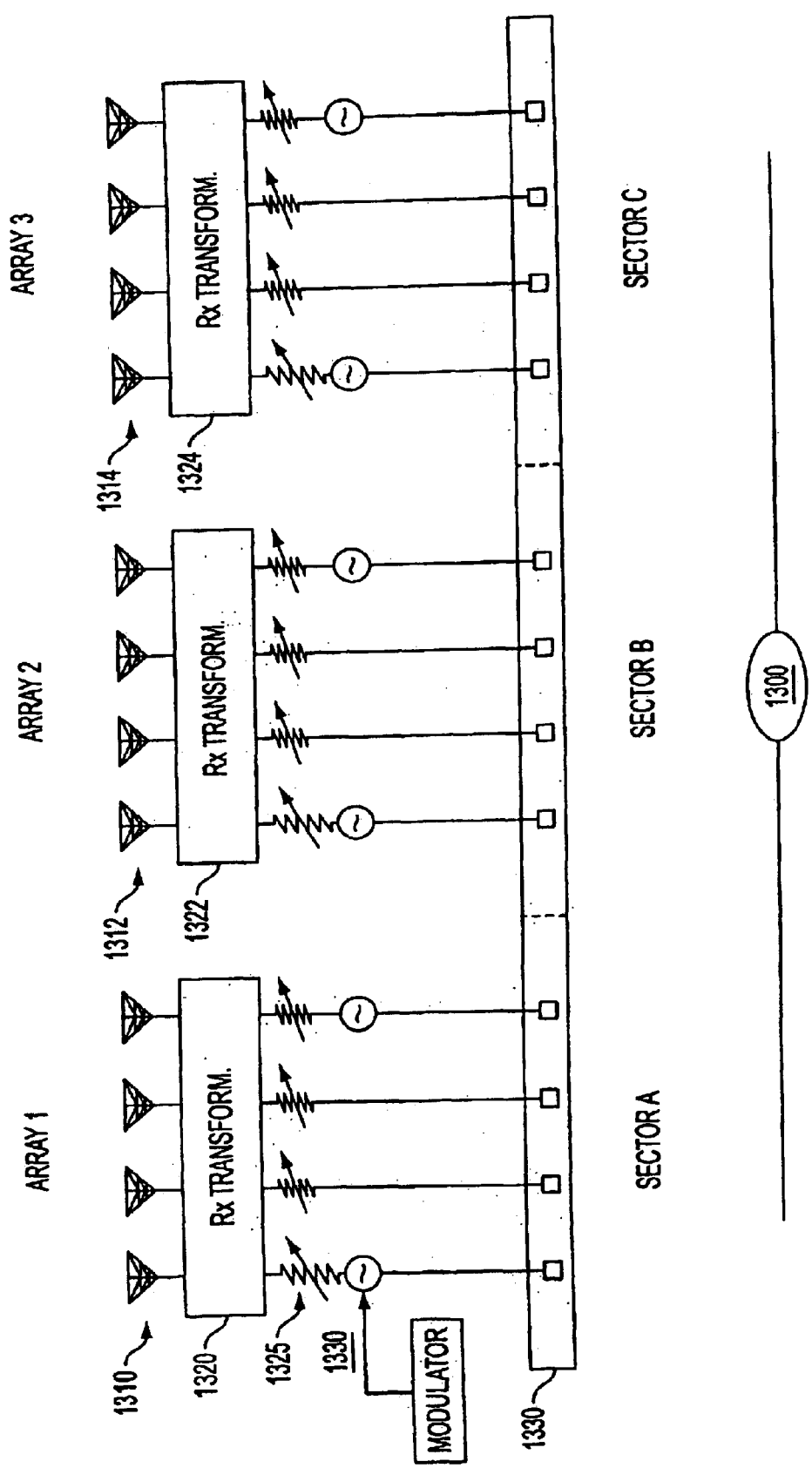
FIG. 13 is a high level diagram illustrating a receive portion of a multiple antenna management BS system.

FIG. 13 illustrates a receive portion of a BS multiple antenna system 1300 comprising a plurality of multi-columnar antenna arrangements 1310, 1312, 1314, each being coupled to a respective transform matrix 1320, 1322, 1324. The beam ports of the transform matrices 1320, 1322, 1324 are coupled to beam port branches which may include adjusting elements, to effect amplitude/gain and phase adjustments, as well as modulators, to apply amplitude, phase, or polarization modulation to the beam port signals. The beam port branches are then coupled to a channelized panel device 1350, wherein each beam port signal corresponding to a sub-beam of a composite beam covering a specific sector portion of a cell is associated with a channel slot on the panel device. The channelized panel device 1350 is configured so that beam port signals comprising a composite beam for a cell sector occupy contiguous channel slots. As such, this configuration provides the capability of redistributing any number of sub-beam patterns from one sector to another sector, by virtue of "patching" beam port signal branches into channel slots corresponding to a desired cell sector. It is to be appreciated that the actual "patching" of one sub-beam pattern from one sector to another may be achieved by manually positioning cables on the channelized panel device 1350. Alternatively, the panel device 1350 itself may be a switching device capable of patching sub-beam patterns into different sectors without manual positioning.

Figure 14:
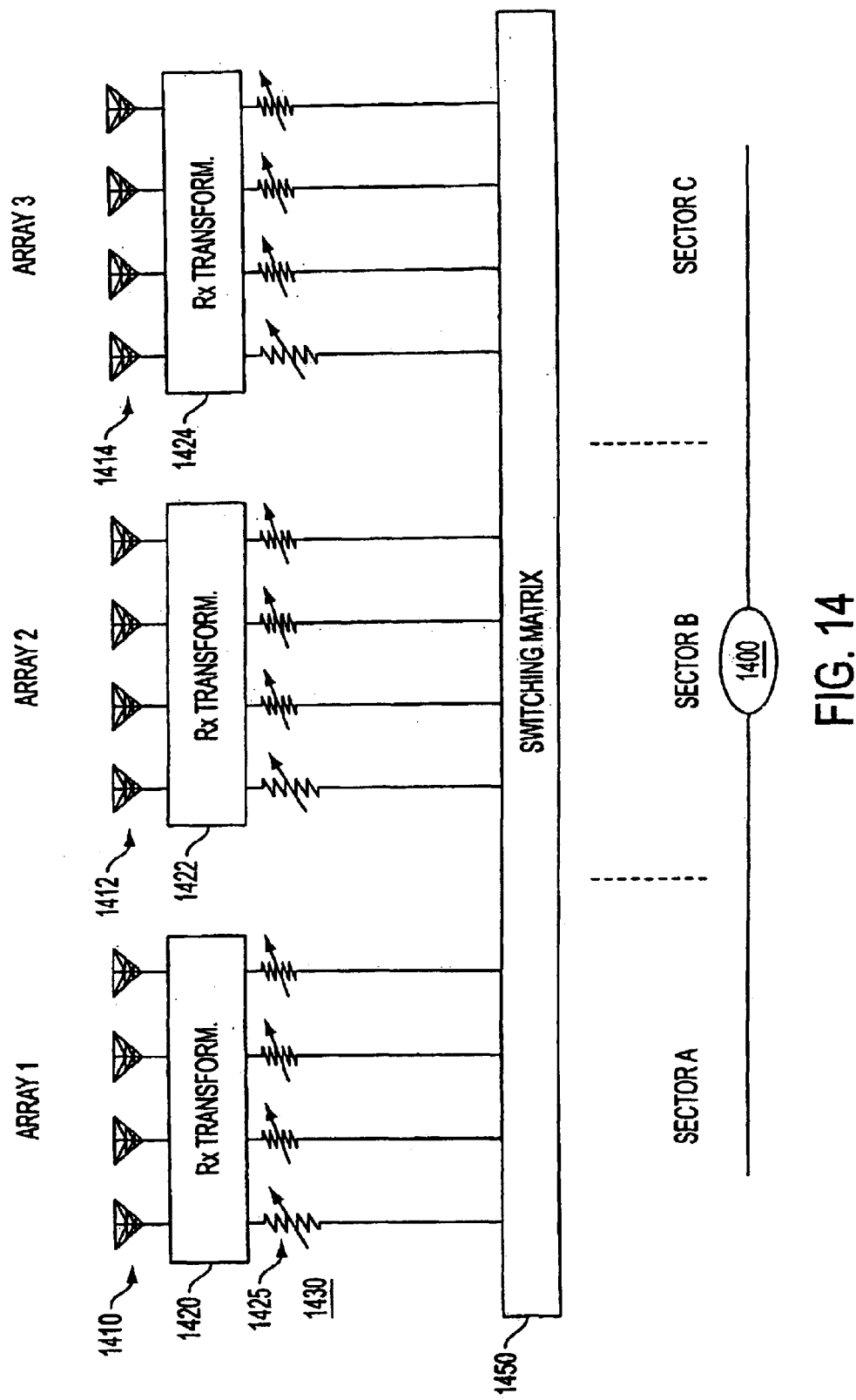
FIG. 14 is a high level diagram illustrating a receive portion of a multiple antenna management BS system.

FIG. 14 illustrates a receive portion of a BS multiple antenna system 1400 comprising a plurality of multi-columnar antenna arrangements 1410, 1412, 1414, each being coupled to a respective transform matrix 1420, 1422, 1424. The beam ports of the transform matrices 1420, 1422, 1424 are coupled to beam port branches, which include amplitude/gain elements to adjust the amplitude of the beam port signals. The beam port branches are then supplied to a switch mechanism 1450, which is capable of redistributing any number of sub-beam patterns from one sector to another sector. The switch mechanism 1450 may be configured so that all the beam port signals having identical phase centers and generating sub-beam patterns to form a sector composite beam pattern, are grouped together. Furthermore, each of the beam port signal groupings is delayed by a predetermined amount that is unique to each grouping, such that a relative delay exists between adjacent sub-beam patterns not sharing identical phase centers (i.e., adjacent sub-beam patterns that are on opposite sides of a sector boundary). Such a configuration provides beam pattern diversity by uncorrelating the sub-beam patterns for each sector and minimizes interference between sub-beams on opposite sides of sector boundaries.

Figure 15A:
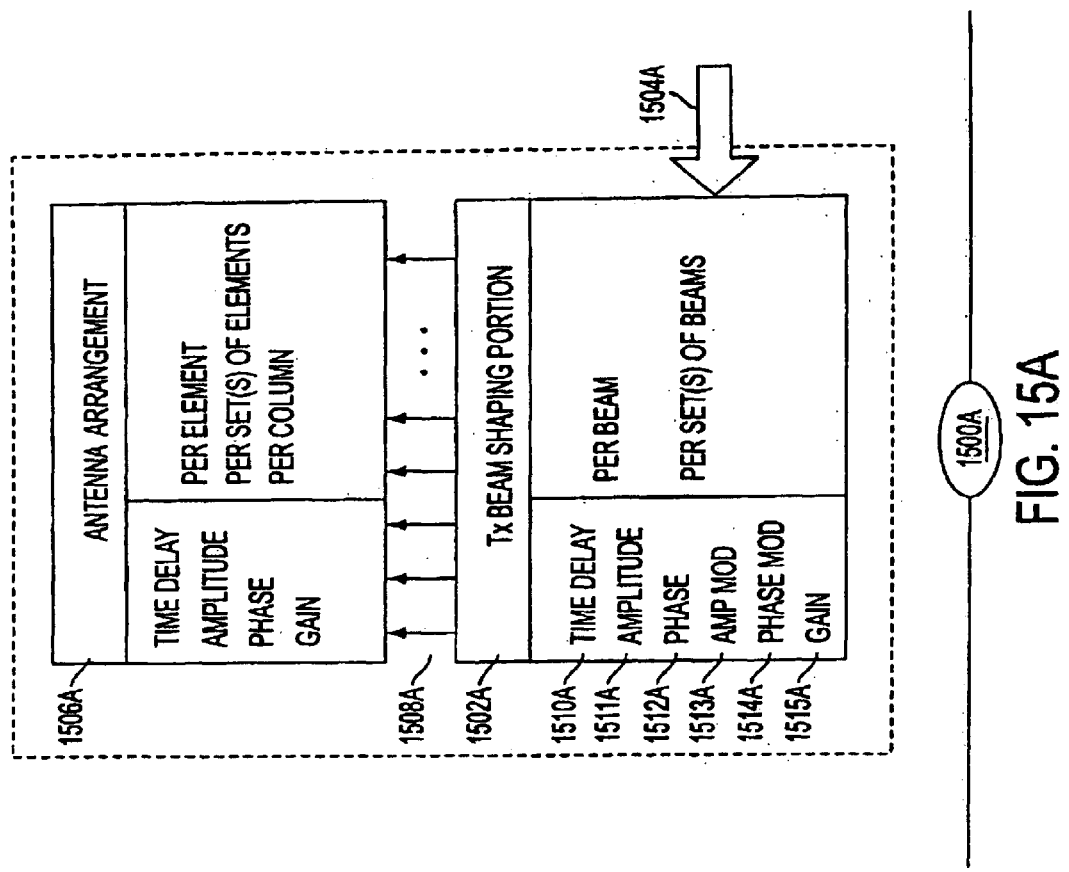
FIG. 15A is a functional block diagram of a directional transmit antenna subsystem.
Figure 15B:
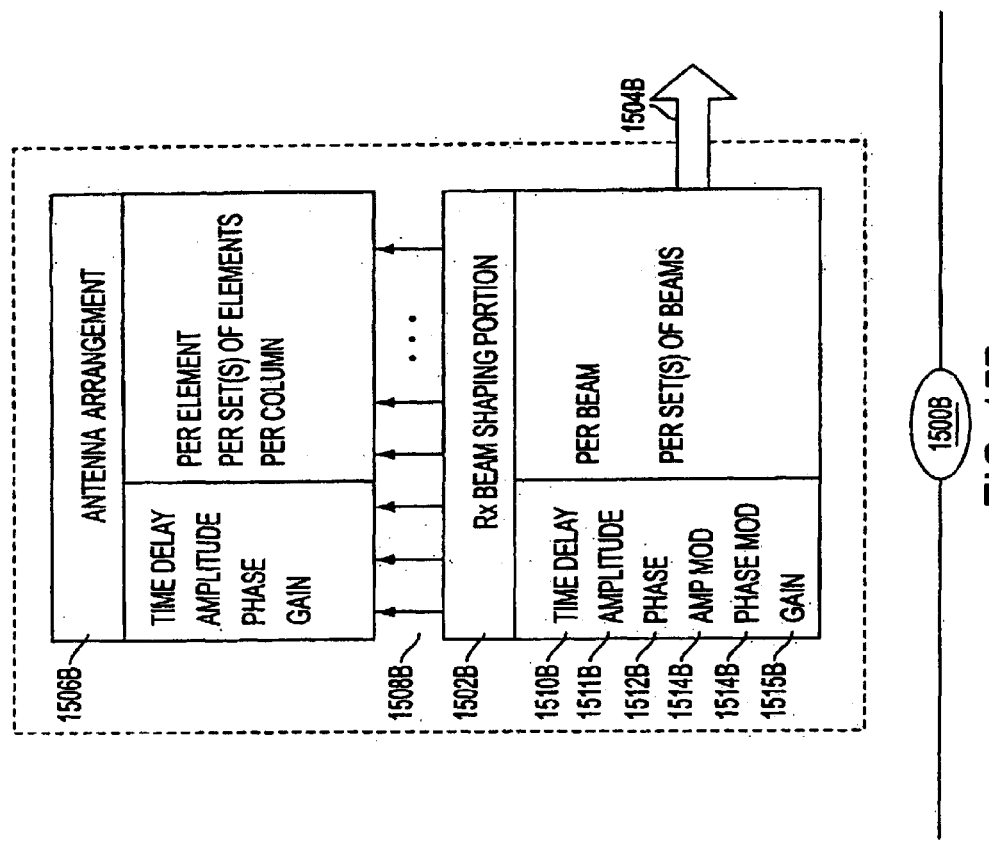
FIG. 15B is a functional block diagram of a directional transmit antenna subsystem.

FIG. 15A illustrates a system-level functional block diagram of a directional transmit antenna subsystem 1500A. FIG. 15B illustrates a system-level functional block diagram of a directional receive antenna subsystem 1500B. The directional transmit and receive antenna subsystems 1500, 1500B may be co-located at a BS to form a combined directional antenna subsystem. Transmit beam shaping portion 1502A includes an input for receiving transmit RF signals 1504A. These RF signals 1504A include information regarding transmission channel slots, which are used to transmit information to be received by MSs.

The antenna arrangement 1506A, as illustrated in FIG. 15A, comprises a plurality of antenna arrays coupled to respective output antenna ports 1508A of transmit beam shaping portion 1502A. While the specific embodiment illustrated in FIG. 15A provides a number of columns which equals the number of antenna ports 1508A, this does not preclude other configurations in which the relationship of antenna ports to arrays is not 1-to-1. It is to be noted that the specific antenna arrangements and antenna element configurations may be designed in any manner consistent with the various embodiments disclosed in this application.

A number of parameters pertaining to individual beam patterns or sets of beam patterns may be processed by transmit beam shaping portion 1502A. As illustrated in FIG. 15A those parameters comprise time delay 1510A, amplitude 1511A, phase 1512A, amplitude modulation 1513A, phase modulation 1514A, and gain 1515A. More specifically, one or more of these parameters may be set or adjusted. For example, the time delay of a specific beam pattern may be adjusted or set to a specific value. In addition, the time delay may be set to a given value, or adjusted, in a manner that affects a set of beams processed by transmit beam shaping portion 1502A. That set may comprise the complete set of beam patterns or a subset of those beam patterns. Other parameters, such as amplitude and phase, for example, may similarly be set or adjusted on a per beam or a per beam set basis. The amplitude and phase modulation parameters can be defined and applied to individual beams or to a set of beams, for example, to achieve a modulation of relative amplitudes among the beams in that set or to effect a modulation of the relative phase among beams within a set. Similar parameters may be individual set and/or adjusted on the antenna side, i.e., within antenna arrangement 1506A. The parameters may be set and/or adjusted with respect to individual antenna elements, sets of those elements, or entire antenna element columns. In the illustrated embodiment, those parameters include time delay 1516A, amplitude 1517A, phase 1518A. All, a subset, or different parameters may be made settable or adjustable within the antenna arrangement.

Specific circuits (some of which are set forth below) may be utilized to implement one or more of the parameter settings or adjustments referred to in FIG. 15A. For example, transmit beam shaping portion 1502A may be implemented with known circuit components, including a transform matrix, such as the Butler Transform Matrix.

Figure 15C:
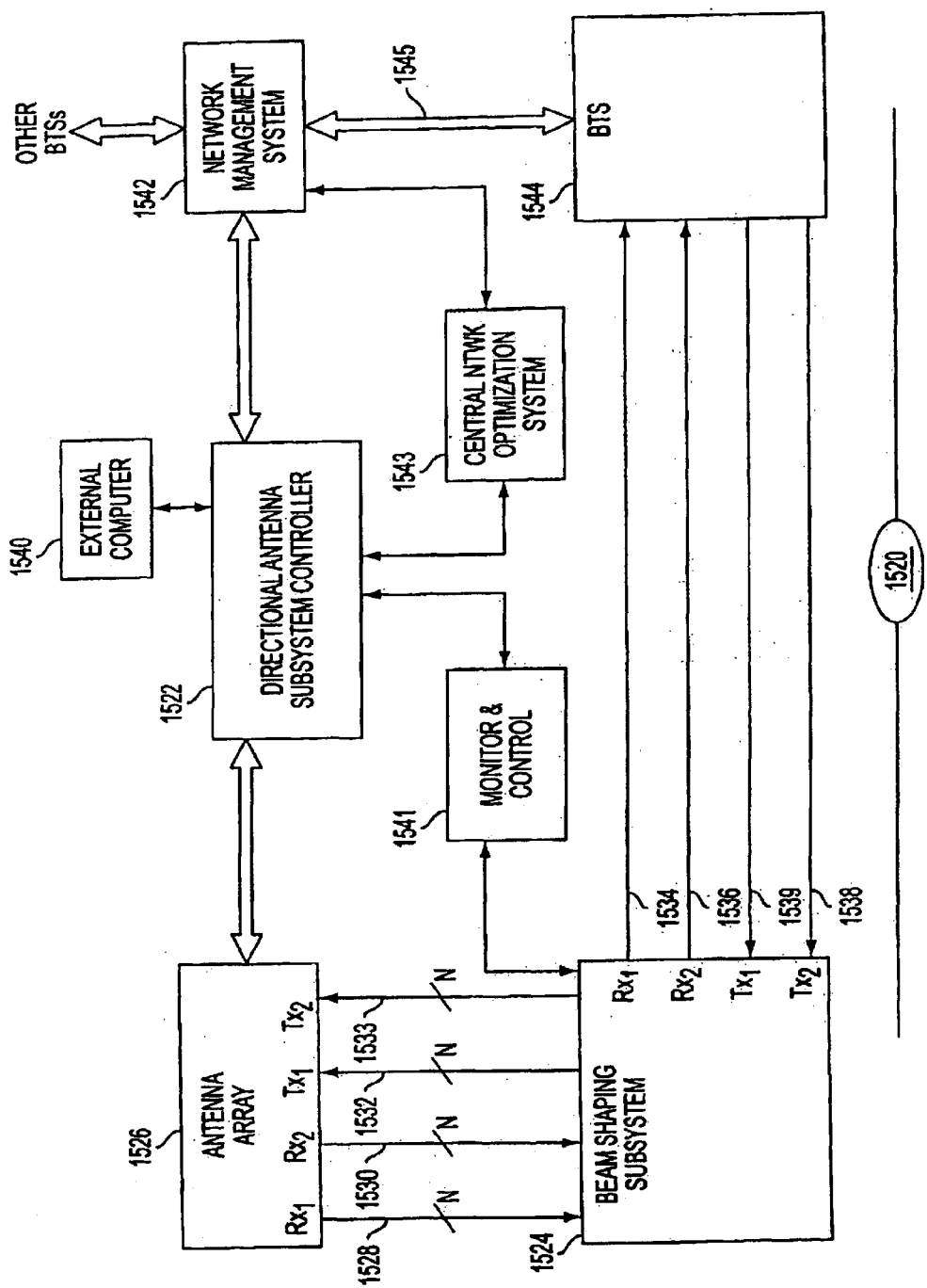
FIG. 15C is a functional block diagram of an exemplary BS system.

The antenna elements may be implemented with the use of antenna radiator units (ARUs) as disclosed in the related Shapira application filed on even date herewith and as briefly described above (FIG. 3A). ARUs may comprise adjustable circuit elements which are both monitored and controlled by a monitor and control portion provided within the ARU. As shown in FIG. 15C, a communication mechanism 1541 may be provided between beam shaping portion 1502A and a directional antenna subsystem controller 1522 and the monitor and control portions provided within the ARUs. Accordingly, a specific instruction can be communicated to adjust or set a given circuit element within the ARU. That circuit element may comprise, for example, a time delay element, an amplitude adjustment element (e.g., a given amplifier in a given transmit or receive path), or a phase adjusting element. Accordingly, in order to adjust the amplitude of a given set of beams, an amplifier on the transmit or receive path, as appropriate, may be adjusted via the monitor and control portion of the ARU. This can be done instead of or in addition to adjusting the amplitude of a given beam by the amplitude setting part 1511A of beam shaping portion 1502A.

FIG. 15B depicts a receive directional antenna subsystem 1500B, which comprises a receive beam shaping portion 1502B, and a receive antenna arrangement 1506B. Receive directional antenna subsystem 1500B is the functional inverse of transmit directional antenna subsystem 1500A. As such, a set of antenna ports are coupled between receive beam shaping portion 1502B and receive antenna arrangement 1506B. The received RF signals are subsequently supplied to output 1504B.

FIG. 15C provides a block diagram of an exemplary BS system 1520. The illustrated system comprises a directional antenna subsystem controller 1522 coupled to a beam shaping portion 1524, which is in turn coupled to an antenna array 1526. The beam shaping portion 1524 comprises two sets of receive antenna ports 1528, 1530 which correspond to two sets of receive elements (e.g., main receive and diversity receive) provided within antenna array 1526. Similarly, two sets of transmit antenna ports 1532, 1533 are coupled to two sets of transmit elements (e.g., main receive and diversity receive) within antenna array 1526. The beam shaping portion 1524 also includes two sets of receive beam ports 1534, 1536 and two sets of transmit beam ports 1538, 1539. The beam ports enable the coupling of BTS 1544 to beam shaping portion 1524. While the connections among antenna array 1526, beam shaping subsystem 1524 and BTS 1544 are shown as comprising certain sets of ports, any suitable connections could be provided which facilitate the transfer of Rx and Tx signals.

Directional antenna subsystem controller 1522 may be further coupled to an external computer 1540, a network management system 1542, and a BTS 1544. A mechanism 1545 may be provided for allowing communication directly between network management system 1542 and BTS 1544. Network management system 1542 may also comprise an interface for receiving information from other BTSs. By way of example, antenna array 1526 may comprise a combination of columnar arrays as illustrated in FIG. 1. Thus, each main receive antenna element and diversity receive antenna element may be linearly slant-polarized and each main transmit antenna element and diversity transmit antenna element may be vertically polarized, as shown in FIG. 2A. Alternatively, all antenna elements may be linearly slant-polarized, as indicated in FIG. 2B.

Figure 15D:
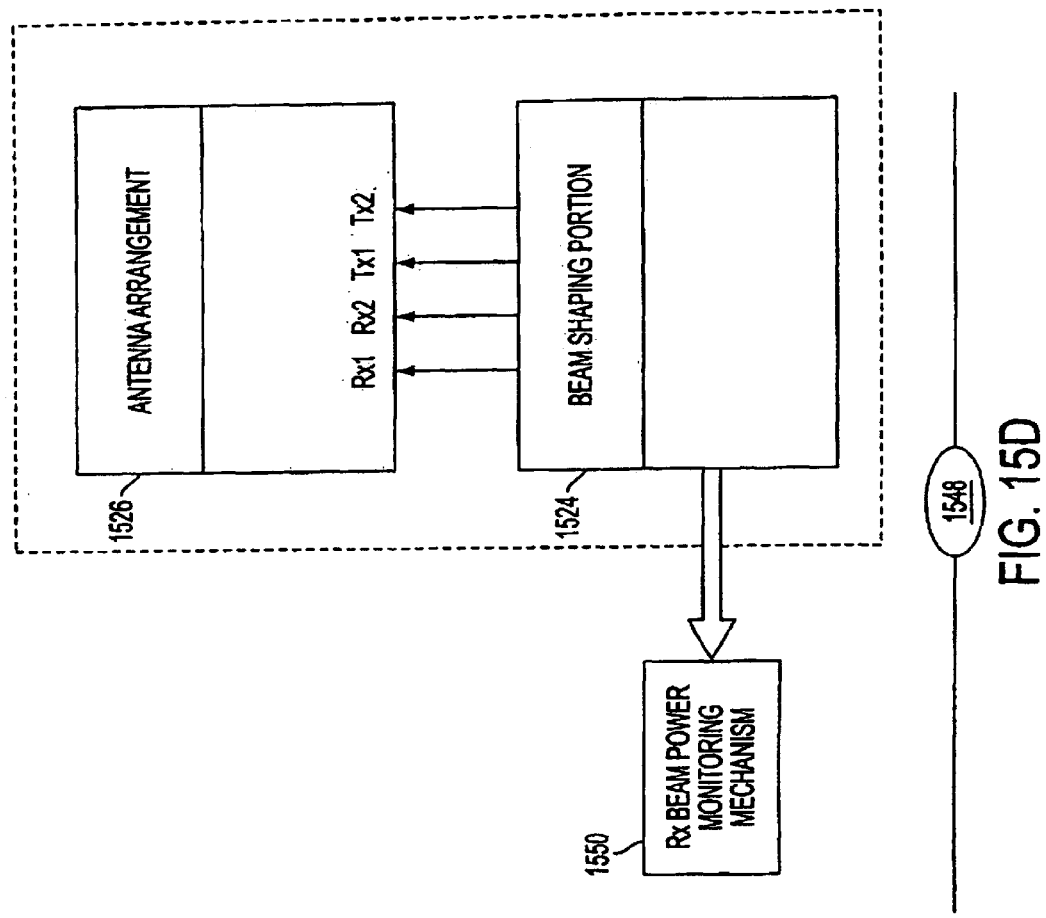
FIG. 15D is a functional block diagram of another exemplary BS system.

FIG. 15D illustrates an antenna subsystem 1548, which demonstrates a variation on the system architecture illustrated in FIG. 15C. In the embodiment illustrated in FIG. 4D, an antenna arrangement 1526 is coupled to a beam shaping portion 1524 while other elements of the exemplary BS system are not shown in FIG. 15D (for the sake of simplification). However, an additional receive beam power monitoring mechanism 1550 may be provided which functionally monitors the power of the receive beam at each beam port of beam shaping portion 1524. These beam ports may be monitored for this purpose at any appropriate location that is indicative of the receive beam power for those respective beams. For example, a mechanism may be provided within beam shaping portion 1524 which simply provides a coupling to the various beam ports on the receive side to a power measurement mechanism, and generates digital values that are stored in respective registers corresponding to the respective beam ports.

Antenna array 1526 may comprise an array that forms N beams, and may be further provided with monitor and control portions, for example, as is described in the aforementioned related patent application. In addition, a monitoring and control portion may be provided as part of beam shaping portion 1524. Directional antenna subsystem controller 1522 may comprise an IDU as disclosed in the above-identified related application, and it may be further provided with a monitoring and control portion as forms part of the IDU. Network management system 442 comprises a network information database. BTS 1544 comprises sub-portions which include a transmit section, a main receive section, a diversity receive section, and an interface to network management system 442.

As indicated in FIG. 15C, the receive antenna elements may comprise pairs of orthogonally polarized receive antenna elements. The elements within each such pair may be independently controlled (i.e., the antenna gain associated with each of those elements may be independently controlled). In addition to independently controlling the differently polarized receive elements, the transmit elements, which may be vertically or orthogonally polarized, may also be independently controlled.

Figure 16:
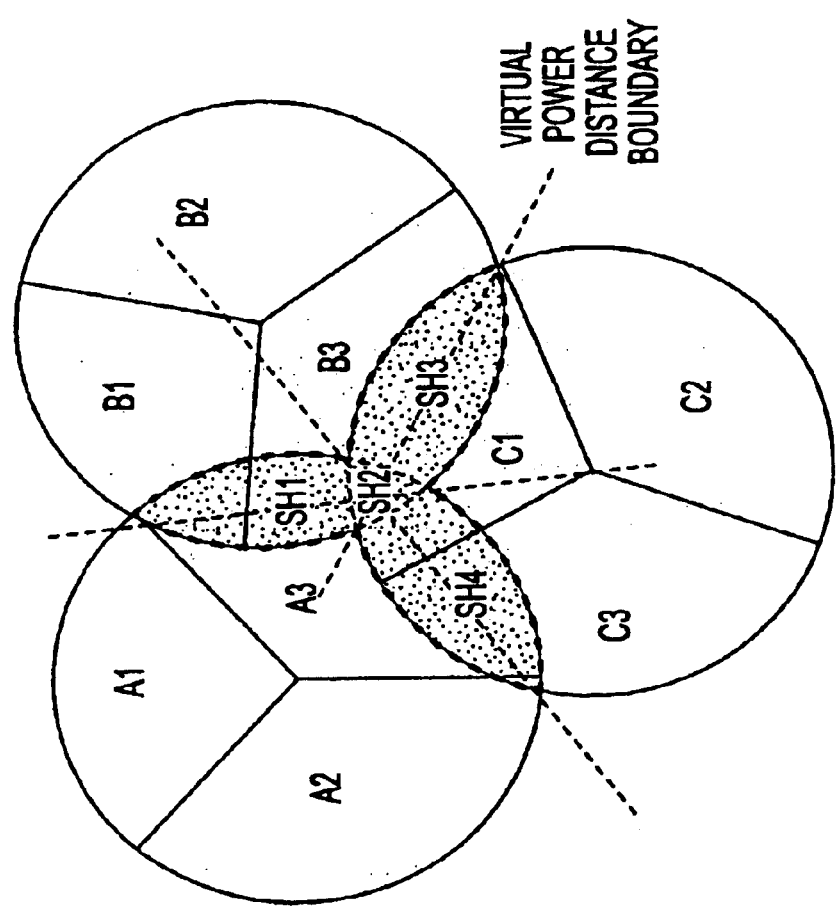
FIG. 16 is a diagram depicting overlapping cells and soft hand-off zones.

FIG. 16 illustrates a set of cells, A, B, and C, which form part of a coverage area for a given cellular network. This diagram is provided for reference purposes to facilitate the following discussion regarding optimization. Each of the three cells depicted in FIG. 16 is divided into 3 sectors. More specifically, each of the cells has its own BS, which comprises an antenna arrangement for radiating antenna transmit and receive beam patterns generally corresponding to the shapes shown in FIG. 16. Those beam patterns overlap each other so as to form the soft handoff zones SH1, SH2, SH3, and SH4, as depicted in FIG. 16.

Figure 17A:
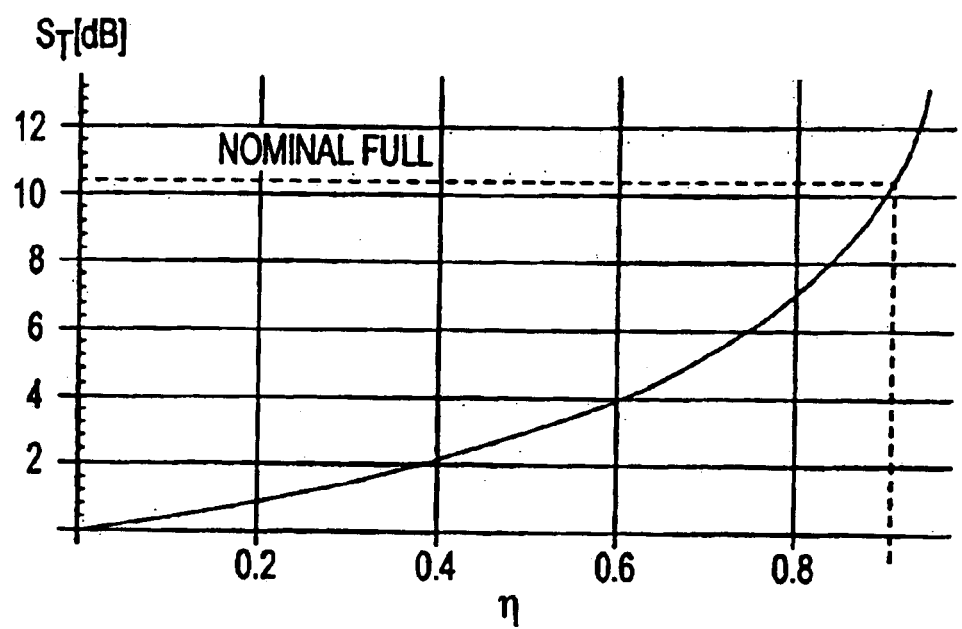
FIG. 17A is a graph of BTS received power versus load.
Figure 17B:
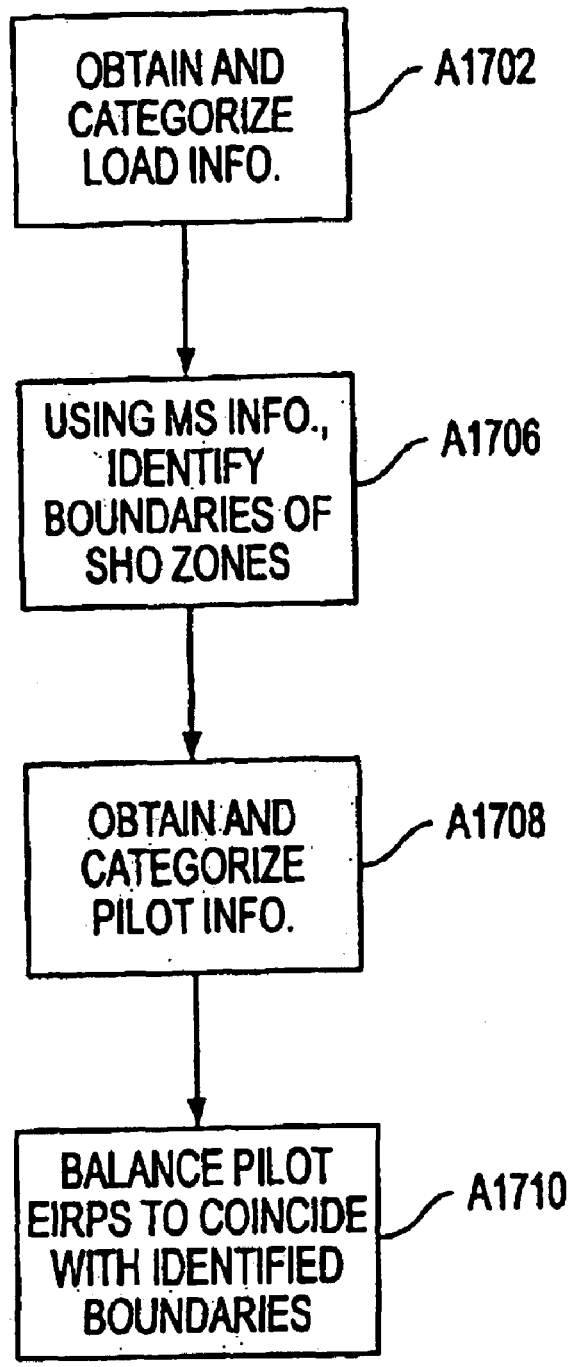
FIG. 17B is a flow chart of an optimization process.

Certain network optimization features will now be described, including a description of an optimization algorithm illustrated in FIGS. 17A–17B. These features may be used together, or subsets of them may be used to improve (i.e., to optimize) various aspects of a cellular communication network. The algorithm illustrated in FIGS. 17A–17B provides a specific implementation of a process which may be performed by the directional antenna subsystem controller 1522 shown in FIG. 15C or, alternatively, by the transmit and receive beam shaping portions 1502A, 1502B shown in FIGS. 15A and 4B. The illustrated optimization algorithm optimizes the beam patterns formed by the antenna arrangement for a given coverage area. As described below, the specific embodiment is capable of performing the optimization on a cell-by-cell basis or for a certain group of cells in a localized geographic area.

Many aspects of a cellular communication network may be optimized. On a larger scale, optimization may involve a minimum frame error rate (FER) on both the forward and reverse links. Another goal is to minimize the number of dropped calls and a the number of calls which are not received by a given MS. The capacity of the network will be maximized both from a local standpoint (e.g., on a sector-by-sector basis) and overall (i.e., throughout the entire cell or throughout a coverage area including a plurality of cells). In addition, optimization may provide for a minimal EIRP so that a substantial amount of energy will not be radiated (e.g., for regulatory and safety reasons). Moreover, minimal EIRP results in the saving of power and assets. For example, systems radiating less power require less expensive components. Furthermore, the MS device power required for quality communications may be minimized. This will allow the MSs to be more compact and less expensive, while promoting longer battery life and creating less of a radiation hazard.

The optimization features presented herein may be used with existing systems and cellular technologies and with existing assets. In other words, by providing such features together with existing standards and cellular technologies, their benefits may be realized without substantial and costly changes to the cellular infrastructure.

Various aspects of the optimization features disclosed herein may involve known techniques or concepts, some of which are disclosed in the following references: U.S. Pat. No. 5,499,395 (Doi) entitled "Cellular Mobile Communications System Having Apparatus for Changing Boundaries of Cells According to Traffic Conditions; "U.S. Pat. No. 5,861,844 (Gilmore) entitled "Method and Apparatus for Providing Redundant Coverage within a Cellular Communications System; "A. Jalali: On Cell Breathing in CDMA Networks; Charles Wheatley: Trading Coverage for Capacity in Cellular Systems: a System Perspective, Microwave Journal, July 1995; J. Shapira: Microcell Engineering; and J. Shapira: The forward Link in CDMA IS95, URSI Workshop, Jun. 5, 1997. The content of each and every one of these references is hereby incorporated by references in their entireties.

Reverse Link

A number of parameters and factors will affect capacity and performance over the reverse link. Those include path loss issues, which relate to the ratio $E_b/I_0$. This ratio is a function of the multipath environment and the steps taken to mitigate both path losses and multi-path losses. In other words, the $E_b/I_0$ is indicative of channel quality and comprises a frequency dependent part of path loss, while path loss in general is not dependent upon a given frequency within the band. To minimize path losses, cellular systems control the power emitted by the MSs within a given coverage area (e.g., a sector or cell) over the reverse link. These power adjustments are applied equally in the radial direction (i.e., omni-directional), since MSs typically do not possess directional transmit capabilities.

There is a direct trade-off between capacity and performance: the higher the actual $E_b/I_0$ is, the higher the performance (lower FER) and the lower the capacity.

Various types of diversities may be employed to mitigate path losses.

Soft Hand-Off (SHO) provides additional space diversity, macro space diversity, and control of the other-cells interference. Larger SHO zones require a larger number of cell assets (channel cards); thus limiting the area of an SHO zone can be beneficial. Softer hand-off (between sectors of the same BS) provides additional space/antenna diversity, and control of adjacent sector interference. The pathloss is correlated for collocated sector antennas and there is no macro space diversity. No extra channel cards are required.

Forward Link

Some of the features mentioned apply to digital systems, such as CDMA for illustrative purposes. However, the network optimization features herein may be employed in other types of cellular networks.

A number of parameters and factors will affect capacity and performance over the forward link. Those include path loss issues, which relate to the ratio $E_b/I_0$. The $E_b/I_0$ required on the forward link is different than that of the reverse link. Coherent reception reduces the requirement for a high $E_b/I_0$. In addition, the use of orthogonal transmission codes eliminates in-cell interference. Interference grows toward the boundaries of the cells/sectors. When there is no transmit antenna diversity (e.g., space, polarization, angular) at the BS, the required $E_b/I_0$ is increased.

A fast, high dynamic range power control at the transmit side of the BS helps performance for the slow moving MS, e.g., in environments with a single ray, Rayleigh fading.

A loss of orthogonality due to long-delayed multipath effects will induce in-cell interference.

Soft hand-off provides space micro and macrodiversity. However, it draws power from both BSs involved in the hand-off. This is only partially compensated by the BS transmit power control measures. Additional BS transmit power for the SHO zone contributes to the interference to all other MSs near or in the same SHO zone.

Softer Hand-off provides only micro diversity, because pathloss is fully correlated.

Network Optimization.

A number of actions can be taken to optimize the network, e.g., by enhancing the BSs. These actions may form an initial part of an overall network optimization approach.

Measures may be taken to modify the BS to enhance coverage, and thus reduce the density of BSs in the network. Such measures include using high antenna gain, diversity techniques, and by providing low noise figure amplifiers in the receive paths. Various embodiments disclosed herein, e.g., the ARU, certain antenna arrangements, and certain beam shaping systems can be used to enhance coverage.

Capacity can be enhanced by using a high EIRP and incorporating diversity techniques. Link balancing helps with the achieving of the same coverage, without excessive interference, and helps avoid deterioration and dropping of calls.

Soft Hand-off balancing may be employed which involves balancing the reverse links of the adjacent cells to the same point where the pilots of these cells have equal power levels as received by the BS. This helps ensure that the SHO zone is sufficiently overlapped for the pilots and the reverse links, and enables the minimization of the SHO zone around the balance point. SHO balancing thus helps prevent situations where an MS loses or cannot obtain a pilot during the hand-off process.

Another measure which can be employed involves matching the cell size to the required capacity, while maintaining continuity ("cell breathing"). This means varying the sector angular span, for sector loading which is uneven among sectors in a given cell and/or in a given group of cells, and varying the cell range for uneven cell loading within a given cluster of cells.

Coverage/Capacity Control of the Reverse Link

The environment in a cell/sector is seldom homogeneous. Certain areas may have delayed multipath components that support rake diversity, while others—e.g., a single ray Rayleigh—dominated environment do not. Certain areas are subject to more interference than other areas. Power control techniques may be employed where the power of all MS transmissions within a given cell or sector is adjusted to reach the BTS with the same S/N ratio. It is to be noted that the $E_b/I_0$ that satisfies the FER requirement—may differ for MSs in different areas within the cell/sector. Zones that enjoy more diversities may then stretch further out, while others—shrink. Similarly—areas with excessive interference (due to adjacent cells/sectors) may need deliberate suppression of the interference by reducing the gain in that direction.

The control over the shape of the receive antenna gain across the sector is therefore a very powerful tool in optimizing the coverage and increasing capacity. The gain shape that optimizes the reverse link is not necessarily the one that optimizes the forward link, because these links are different.

Accordingly, to best optimize a given coverage area, separate gain control may be employed in the BS for the reverse and for the forward links.

The reverse link equation is $$q \equiv \frac{S}{N_0 W} = \frac{\frac{C}{I}}{1 - \left\{(1-n)(1+f)v\frac{C}{I}\right\}} \equiv \frac{\frac{C}{I}}{1-\eta} \quad (1)$$

And the balance between two cells is then $$\frac{q_1}{q_2} = \frac{T_1}{T_2}$$

where
  C/I is the signal (carrier) to noise and interference ratio,
  q is the signal power normalized to thermal noise,
  S is the power received at the BS from each user,
  $N_0$ is the thermal noise spectral density at the receiver input,
  W is the modulated carrier bandwidth,
  n is the number of active calls,
  f is the ratio of outside the cell/sector to within the cell/sector interference
  v is the voice activity factor, and
  T1 and T2 are the transmission losses between the MS and the respective BSs.

Beam Shaping Optimization of the Reverse Link.

A beam shaper may be incorporated on the receive (and/or the transmit) portion of a BS. A beam may form and control the shapes of multiple beams which together form a rosette covering the sector, while each individual beam covers a fraction of the sector. A number of different exemplary embodiments of shapers are disclosed herein. A group of rosettes may cover the whole 360 degrees of azimuth around the BS. Each beam goes through a controlled amplifier, and then all beams belonging to a sector are combined into the BTS receiver. Each beam is also monitored by a total power receiver.

There are advantages to providing a shaper as opposed to alternative sector antenna arrangements. One such advantage involves the extent of control over the beam shape. The slopes of the beams may be made much steeper than those of a classical sector antenna, thus reducing inter-sector overlap, interference leakage and also helping to contain the softer hand-off zone. The sector coverage is shaped by controlling the gain of each of the beams. This offers a controlled overlap with the adjacent cells, and coverage shaping to accommodate changes in the environment and interference across the sector.

As described previously, with respect to FIG. 15D, e.g., each BS may be equipped with a mechanism for monitoring the total power received in each beam of a given multi-beam. The total power received in a given sector can be used as a measure of the load in the sector, e.g., as shown in FIG. 17A.

$$S_T = \frac{P_{Total}}{N_0 W} = \frac{1}{1-\eta} \quad (2)$$

$$N = \frac{n}{1 - \frac{1}{S_T}}$$

Where N is the asymptotic load, actual setting is within 0.6 to 0.85 of N, and $$\eta = \frac{n}{N}$$

The relative power received in a beam is a measure of relative MS load or excessive out of cell interference. Additional information on the MS distribution, is available at the network management center, and may be used to resolve between the two options.

In a coverage limited beam, increased gain adds range (or penetration) and reduces the MS transmit power. In an interference limited beam, gain reduction shrinks the cell boundary and reduces the interference into the cell. Additional information on the location of the MS, which may be available at the network control center, can be correlated with particular MS reports on difficulties, and compensated by gain control.

Controlling the MS transmit power for the reverse link is limited by the maximum power of the MS. The corresponding control of the forward link is the transmit power setting at the BS and the power control for the individual MS.

Cluttered areas exhibiting a single ray Rayleigh fading characteristic demand very high $E_b/I_0$ unless additional diversity measures are provided (e.g., Tx diversity). A higher gain (higher EIRP) may have to be allocated to these directions in order to even out the coverage range across the sector.

Long-delayed multipath adds interference that is not orthogonal to the signal. This interference is proportional to the total transmitted power from the BTS. The $E_b/I_0$ is very stable as a function of the distance from the BS within the cell in such cases, up to the cell edge where the interference from other cells deteriorates it.

The forward link equation is (approximate)

$$\frac{E_b}{I_0} = \frac{W}{R_b} \cdot \frac{\beta(1+u\alpha)}{\left(\alpha + hx\frac{T_{oc}}{T_i}\right)vl} \quad (3)$$

And on the boundary it is $$\frac{E_b}{I_0} = \frac{W}{R_b} \cdot \frac{\beta(1+u\alpha)}{(\alpha + hx)vl} \quad (4)$$

Where
• is the fraction of the traffic out of the BTS power
alpha is the fraction of the BTS power that is in the delayed multipath
v is the voice activity factor
u is the number of delayed multipath received in the rake receiver $T_i$ is the transmission loss from the home BTS
$T_{oc}$ is the transmission loss from the other BTS
h is the number of other BTS at the boundary
x is the ratio of the load of the other BTSs to that of the home BTS
l number of traffic channels+paging
If the propagation rule around the boundary is assumed to be $R^{-4}$ then:
For a 2-cell boundary $$\frac{T_i}{T_0} \cong 1 + 4\delta\frac{R}{R_0}; \frac{T_{oc}}{T_0} \cong 1 - 4\delta\frac{R}{R_0}; \frac{T_{oc}}{T_i} \cong 1 - 8\delta\frac{R}{R_0} \quad (5)$$

For a 3 cell boundary $$\frac{T_i}{T_0} \cong 1 + 4\delta\frac{R}{R_0}; \frac{T_{oc}}{T_0} \cong 1 - 2\delta\frac{R}{R_0}; \frac{T_{oc}}{T_i} \cong 1 - 6\delta\frac{R}{R_0} \quad (6)$$

The balance of the forward links of two cells is achieved (assume •=0) at $$x = \frac{T_i}{T_{oc}} \quad (7)$$

This means that the forward link of the cell is expanding with the load.

When a sector is loaded non uniformly, a higher EIRP should be allocated to the denser sub-sector, in order to minimize the total transmit power required in the sector. However, this extends the range of the sub-sector.

Beam Shaper Optimization of the Forward Link

An initial measure for sector shaping is based on the variations of the environment, and therefor—the required $E_b/I_0$, across the sector. EIRP compensation is effective.

The Soft Hand-off window is determined by the pilot balancing of the adjacent cells. By making the SHO window symmetrical around the balance of the reverse links of these cells, benefits are achieved including balancing the reverse links, reducing the interference and maintaining a continuous connection while roaming between the cells. An objective is to bring the pilots to balance where the reverse links balance. This requires a control on the pilot power, as a function of the loads in the home cell and in the adjacent cells.

Pilot control can be implemented directly at the BS. However, setting of the total BS transmit power is a more accessible control. When applying this scheme [3] the forward link power control recovers the EIRP needed by each MS, while the pilot remains as set. The shaper offers the control of the EIRP across the inhomogeneous sector. This applies instead of BTS power control, for tuning the pilot within each beam. The rules for the pilot tuning are derived from equations (1) and (7).

The information for the tuning is obtainable at the network management center, or otherwise estimated from the measurements of the total received power for each BTS (equation (2)).

The situation known as "pilot pollution" occurs when many pilots (more than can be handled by the rake receiver of the MS) have similar $E_c/I_0$ in the same area. In such a case all these pilots are bound to have a low $E_c/I_0$, and orphan situations occur for new MSs at their access, locking to one pilot and loosing it soon after. There is no direct way to identify this situation from the measurement of the total received power, though excessive power may be observed due to ill control over MSs in participating cells that are not included in the active set of pilots. Indications of this situation may be obtained:

From the excessive received power

From reports on access failure or dropped calls in that region. The information on the MS location, expected to be available, further clarifies the situation.

From reporting on the active and neighbor sets. These messages are sent by each MS to its BTS.

Once a situation is observed, the EIRP of the relevant beams overlapping in that area from different cells—is controlled in a way to shift the balance and allow for at most three dominating pilots.

FIG. 17B illustrates one example embodiment of an optimization algorithm. One of the factors the optimization algorithm embodiment addresses is the mitigation of path losses and multi-path losses. Existing cellular systems minimize these factors by controlling the power emitted by the MSs within a given coverage area (e.g., a sector or cell) over the reverse link. These power adjustments are applied equally in the radial direction (i.e., omni-directional), since MSs do not possess directional transmit capabilities. This embodiment takes additional steps beyond those of existing systems and varies the shape of the beam pattern along the azimuthal direction in order to mitigate unwanted multi-path and path loss effects.

The shaping of the beam pattern may be achieved by setting up a given BS in a particular manner so that the shape of the beam pattern within predetermined coverage areas (e.g., sectors) has certain desired characteristics both over the reverse link and over the forward link.

Features of the illustrated optimization algorithm embodiment include optimizing BS operations by deploying dynamic/closed-loop processes for the reverse and forward links, which will be described as follows.

Referring to FIGS. 17A and 17B for the reverse link, in a first act A1702, the optimization process first looks at the reverse link attributes, focusing on the load information regarding the number of subscribers/MSs that are communicating with the BS at a given time (i.e., active subscribers). This load information is obtained and categorized on a per sector basis as well as on a per beam basis when sector coverage is achieved by implementing a plurality of beam patterns. The categorization of the load information into sets corresponding to several beams corresponds to the multi-beam nature of certain embodiments of the present invention, for example, as shown in FIGS. 3C–7B, and described in the text corresponding thereto. In order to obtain the load information on a per beam basis, various methods may be used, including, placing a special sensor in a BS receiver which measures incident power on the reverse link and/or using subscriber reporting information obtained from the MSs. The load information is then related to geographic position information (e.g., one common digital representation of a geographic map).

The geographic map may comprise a two-dimensional representation of the geography and the location of various items with respect to that geometry, including, e.g., the cells, sectors, beam patterns, MS locations, and BS locations.

In a next act A1706, for a given cell cluster (e.g., three adjacent cells as shown in FIG. 16), a determination using MS information (e.g., information concerning the locations and power levels of respective MSs within pertinent areas) is then made as to where the boundary line exists between adjacent cells or sectors. These boundary lines demarcate the hand-off boundaries, which correspond to the center of the soft hand-off zones SH1, SH2, SH3, and SH4 for the reverse link.

The BS optimization process then focuses on the forward link attributes and performs certain pilot-related processes. Existing BSs transmit both traffic and pilot signal information over the forward link, and subscribing MSs measure the pilot signal strengths for all pilot signals it receives. When a new pilot signal exceeds a certain strength "threshold," the MS may be instructed to enter into a soft hand-off mode (i.e., SH1, SH2, SH3, and SH4) with that new pilot.

When a MS locks onto a new pilot, it enters into what is generally referred to as a "soft hand-off window." Within this window, there exist a virtual "power-distance" boundary between the adjacent cells. Generally, when the MS reaches that boundary, it will reach a point at which it can switch over to the new coverage area/cell. However, there are instances in which the virtual power-distance boundary falls too close to one of the borders of the soft hand-off window. This can be problematic and result in the loss of the call. Such losses occur, for example, when the MS does not switch to the new pilot in time and travels into the new cell with the old pilot signal.

In act A1708, the illustrated optimization algorithm performs pilot signal processing on the forward link and determines pilot signal power levels with respect to positions on the geographic map. It is noted that a separate "breathing" (i.e., changing over time) map will be provided for the forward link as well as for the reverse link. These breathing maps respectively represent, the forward link and reverse link radiation beam patterns pertaining to the positions and boundaries of the cells and sectors at certain times.

In act A1710, the optimization algorithm adjusts the power levels of the pilot signals of two adjacent BSs so that they are equal/balanced at a location which coincides with the corresponding mapped boundary line identified in act A1706 using reverse link information. Referring to FIG. 16, such a boundary line may be depicted on a geographic map by a line along the center of the soft hand-off zones SH1, SH2, SH3, and SH4.

The directional antenna subsystem controller 1522 may instruct beam shaping subsystem 1524 to adjust the shape of certain individual beam patterns, which causes the pilot signal levels to be modified at certain locations near a hand-off zone area. This may be controlled to force the virtual power-distance boundary to move closer to the center of the soft hand-off window.

Referring back to act A1708, a geographic map of the varying pilot signal power levels may be obtained, for example, by using the pilot information reported by the MSs. As positional information regarding the MSs is provided in newer systems, the locations of the MSs will be easier to identify. However, with present systems, specific positional information regarding each MS is not readily obtainable. Accordingly, an algorithm may be utilized to correlate the pilot signal information obtained by the respective MSs corresponding to a particular area and to identify the location of the MS from which the pilot signal information was obtained. This facilitates the calculation of the pilot signal power level at certain locations on the map. The algorithm may identify the sector the MS is located in, obtain pilot signal power levels in adjacent sectors, correlate the pilot signal information from MSs for pilot signals that are within 5 dB from each, and aggregating those pilots.

Based on the mapped pilot signal information obtained at act 1708, the soft hand-off "islands" are now identifiable based upon forward link information. In act A 1710, these soft hand-off "islands" (which comprise hand-off areas determined from a forward link perspective) are compared to the boundary lines obtained from reverse link information in act 1706, and the levels of the pilot signals within each of these corresponding areas (i.e., within the hand-off zones (reverse link) and within the hand-off islands (forward link)) are compared to a threshold. Those above the threshold are pilots that may be used by an MS falling within those overlapping areas to perform a hand-off.

If the number of pilots within the given overlapping area is greater than an allowable number (e.g., three pilots), this might indicate the occurrence of pilot pollution which can have deleterious effects on the performance of the network in that area, e.g., resulting in dropped calls or unsuccessful attempts to access the network.

The algorithm will make a decision to ignore certain pilots so the number of pilots drops to or below the allowable number. Beam rearrangement or shaping may be performed to reduce the number of pilots, i.e., to reduce the levels of the "ignored" pilots, so that for any soft hand-off zone area there is a maximum number allowed pilots (e.g., three pilots).

To adjust the power levels for the given zone area, the optimization algorithm adjusts the EIRP of those pilots. This may be achieved by adjusting the power allocated to the pilot signal (which will have an equal effect throughout the whole area served by that pilot) and/or by adjusting the antenna gain. Adjusting the power allocated to the pilot signal affects the entire sector while adjusting the antenna gain may be controlled so as to affect individual beams within a given sector (i.e., beam shaping). The power allocated to a pilot signal may be changed at the BS, but requires upgrading the BS software. Alternatively, the total transmit power of the BS may be changed. In this manner, the power control of the BS recovers the power level for each traffic channel while the pilot signal power remains unchanged.

Figure 18:
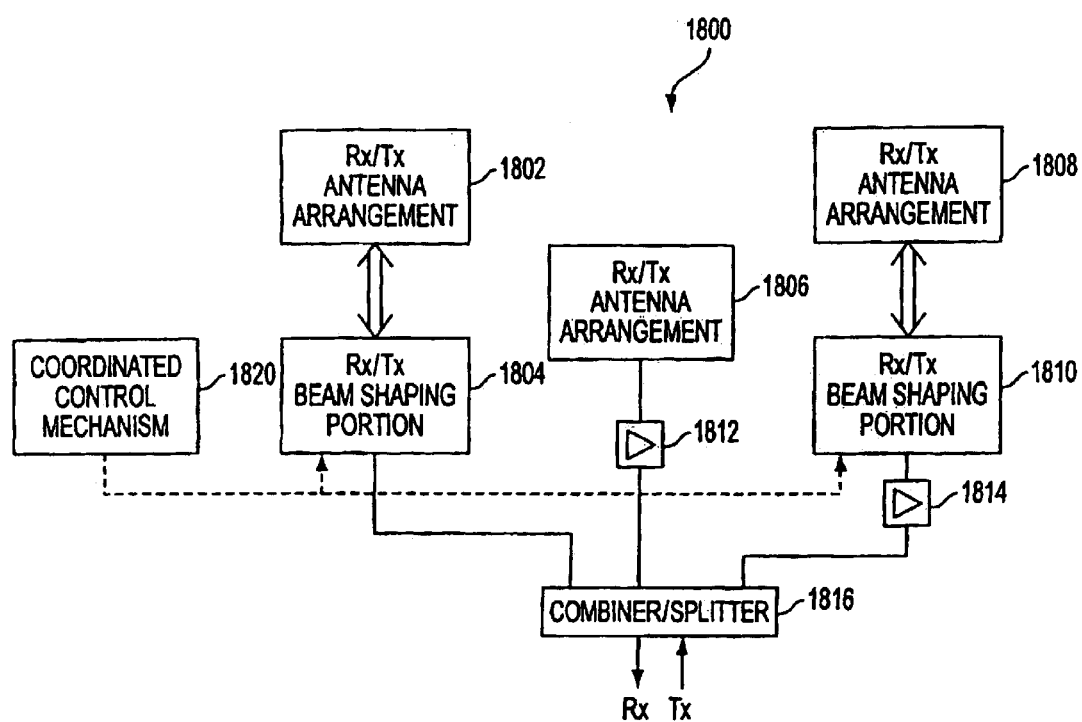
FIG. 18 is a diagram of plural antenna arrangements with coordinated beam shaping control and a common receive and/or transmit RF signal.

FIG. 18 shows a radiation system 1800 comprising plural antenna arrangements 1802, 1806, 1808, etc. coupled to one common BTS (not shown) via a combiner and/or splitter 1816. Each of the illustrated antenna arrangements comprises a transmit and/or receive antenna elements. Some of the antenna arrangements, i.e., 1802 and 1808, are coupled to receive and/or transmit beam shaping portions 1804 and 1810, respectively. Others, including antenna arrangement 1806, do not comprise a beam shaper.

The arrangements shown in FIG. 18 may be provided to accommodate different receive and/or transmit antenna coverage patterns, through one central BTS. Optional delays 1812 and 1814 are illustrated at the BTS side of arrangements 1806 and 1808. These are provided for CDMA systems to eliminate interference patterns by decorrelating the signals with respect to those of the first arrangement 1802. Alternatively, e.g., orthogonal signals may be used for the respective different antenna arrangements for the same purpose, or no such devices may be provided.

A coordinated control mechanism 1820 is illustrated. It may be embodied, e.g., within a controller 1522 as shown in FIG. 15C or within a network management center. Coordinated control mechanism 1820 provides instructions to each adaptive type of antenna arrangement (beam shaping portions 1804 and 1810 as shown) to facilitate coordinated control of antenna patterns for optimizing the parts of cellular network served by those arrangements.

Such coordination may be controlled, for example, by a given optimization algorithm such as the one described above with respect to FIG. 17B. If there is a need to remove pilots from a given hand-off zone area, transmit antenna patterns serving that hand-off zone area may be reallocated; for example, the same area once illuminated by arrangement 1802 may be illuminated from a different angle from a different antenna arrangement 1808.

The illustrated antenna arrangements (or others may be provided) may be connected to the common BTS in parallel or in series. They may be located close by, colocated, or located remotely from each other, e.g., in order to create contiguous coverage and EIRP as needed in different areas within a given coverage area, cell, or sector.

While the invention has been described by way of example embodiments, it is understood that the words which have been used herein are words of description, rather than words of limitation. Changes may be made, within the purview of the appended claims, without departing from the scope and the spirit of the invention in its broader aspects. Although the invention has been described herein with reference to particular structures, materials, and embodiments, it is understood that the invention is not limited to the particulars disclosed.

What is claimed:

1. An antenna array arrangement for a wireless communication network, comprising:

a plurality of transmit active antenna elements, each active antenna element including:

a transmit amplifier;

a bandpass filter receiving a signal from the transmit amplifier;

an antenna structure constructed and arranged to radiate an electromagnetic wave corresponding to a signal from the bandpass filter; and a plurality of receive active antenna elements, each including:

an antenna element constructed and arranged for receiving signals, a receive bandpass filter arranged to receive signals from the antenna element, and a receive amplifier for amplifying signals from the filter.

wherein said transmit active antenna elements and receive antenna elements are disposed in a repeating alternating configuration such that each of said transmit active antenna elements are separated from each other by an optimal distance enabling said transmit active antenna elements to form a relatively narrow transmit beam by combined radiation of at least consecutive ones of said transmit active antenna elements, said beam being steerable by phase control of consecutive ones of said transmit active antenna elements and each of said receive active antenna elements are separated from each other by said optimal distance enabling said receive active antenna elements to form a relatively narrow receive beam by combined radiation of at least consecutive ones of said receive active antenna elements, said beam being steerable by phase control of consecutive ones of said receive active antenna elements, and wherein said transmit active antenna elements are controllable to form a transmit phased array and said receive active antenna elements are controllable to form a receive phased array.

2. The antenna array arrangement of claim 1, wherein said transmit active antenna elements are vertically polarized, said receive active antenna elements are linearly-slant polarized, and said transit antenna elements and receive active antenna elements are configured in a vertical configuration.

3. The antenna array arrangement of claim 1, wherein said transmit active antenna elements are vertically polarized, said receive active antenna elements are linearly-slant polarized, and said transit antenna elements and receive antenna elements are configured in a multi-columnar configuration.

4. The antenna array arrangement of claim 1, wherein said transmit antenna elements and said receive antenna elements are linearly-slant polarized and said transmit antenna elements and receive antenna elements are configured in a vertical configuration.

5. The antenna array arrangement of claim 1, wherein said transmit antenna elements and said receive antenna elements are linearly-slant polarized and said transmit antenna elements and receive antenna elements are configured in a multi-columnar configuration.

6. The antenna array arrangement of claim 1, further including a plurality of active radiating units, wherein said transmit antenna elements and said receive antenna elements are incorporated within said active radiating units.

7. A cellular base station antenna system comprising:
a multi-columnar antenna arrangement comprising:
a plurality of active transmit antenna elements, each active transmit element including:
a transmit amplifier;
a bandpass filter receiving a signal from the transmit amplifier;
an antenna structure constructed and arranged to radiate an electromagnetic wave corresponding to a signal from the bandpass filter; and
active receive antenna elements, each active receive antenna element including:
an antenna element constructed and arranged for receiving signals;
a receive bandpass filter arranged to receive signals from the antenna element, and
a receive amplifier for amplifying signals from the filter;
a transmit transform matrix, coupled to said multi-columnar antenna arrangement, for processing signals to be transmitted by active transmit antenna elements; and
a receive transform matrix, coupled to said multi-columnar antenna arrangement, for processing signals received by active receive antenna elements,
wherein, said transmit transform matrix and said receive transform matrix are separate and each one forms a plurality of narrow beam patterns that span different angular directions in a predetermined plane and each of said matrices comprises phase definitions, thereby to provide a phased array respectively for each input port of the transmit transform matrix enabling said transmit active antenna elements to form said plurality of relatively narrow transmit beams by combined radiation of at least consecutive ones of said transmit active antenna elements, said relatively narrow transmit beams being steerable by phase control of consecutive ones of said transmit active antenna elements, and each output port of the receive transform matrix enabling said receive active antenna elements to form said plurality of relatively narrow receive beams by combined radiation of at least consecutive ones of said receive active antenna elements, said relatively narrow receive beams being steerable by phase control of consecutive ones of said receive active antenna elements.

8. The base station antenna system of claim 7, wherein said transmit transform matrix and said receive transform matrix contain beam ports which are coupled to amplitude adjusting elements, gain adjusting elements, and phase adjusting elements for controlling a shape of said plurality of narrow beam patterns.

9. A base station antenna system comprising:
a multi-columnar antenna arrangement containing at least two active polarization diversity antenna elements, each of said active polarization diversity antenna elements comprising an antenna structure, an amplifier and bandpass filter;
a delay unit coupled to one of said at least two polarization diversity antenna elements for delaying a signal of said coupled antenna element; and
a transform matrix coupled to said delay units and to undelayed ones of said at least two polarization diversity antenna elements, and constructed to form a plurality of narrow beam patterns that span different angular directions in a predetermined plane, said transform matrix having a plurality of beam ports and a plurality of antenna ports, and defining a phase relationship between said antenna elements.

10. A system according to claim 9, wherein said two diversity polarization antenna elements are receive antenna elements, said transform matrix processes signals received by said active receive antenna elements, and said delayed signal of said coupled antenna element is combined with a signal from the other antenna element before being processed by said transform matrix.

11. A system according to claim 10, wherein said two polarization diversity antenna elements are transmit antenna elements, said transform matrix processes signals to be transmitted by said active transmit antenna elements, thereby to provide transmit diversity.

12. A base station antenna system comprising:
a multi-columnar antenna arrangement containing a plurality of first active antenna elements and a plurality of second active antenna elements, said plurality of first active antenna elements having polarization diversity from said plurality of second active antenna elements;
a first transform matrix, coupled to said multi-columnar antenna arrangements, constructed to form a plurality of narrow beam patterns that span different angular directions in a predetermined plane, said first transform matrix being associated with said plurality of first active antenna elements and having a plurality of beam ports coupled to a plurality of adjustment elements for adjusting a first plurality of beam port signals;
a second transform matrix, coupled to said multi-columnar antenna arrangement, constructed to form a plurality of narrow beam patterns that span different angular directions in a predetermined plane, said second transform matrix being associated with said plurality of second active antenna elements and having a plurality of beam ports coupled to a plurality of adjustment elements for adjusting a second plurality of beam port signals;
a first combiner for generating a first combined signal by combining all signals in said first plurality of beam port signals;
a second combiner for generating a second combined signal by combining all signals in said second plurality of beam port signals;
a delay unit coupled to said first combiner for delaying said first combined signal; and
a third combiner for combining delayed first combined signal and second combined signal.

13. A base station antenna system comprising:
- a multi-columnar antenna arrangement containing a plurality of first active antenna elements and a plurality of second active antenna elements, said plurality of first active antenna elements having polarization diversity from said plurality of second active antenna elements;
- a first transform matrix, coupled to said multi-columnar antenna arrangements, constructed to form a plurality of narrow beam patterns that span different angular directions in a predetermined plane, said first transform matrix being associated with said plurality of first active antenna elements and having a plurality of beam ports coupled to a plurality of adjustment elements for adjusting a first plurality of beam port signals;
- a second transform matrix, coupled to said multi-columnar antenna arrangements, constructed to form a plurality of narrow beam patterns that span different angular directions in a predetermined plane, said second transform matrix being associated with said plurality of second active antenna elements and having a plurality of beam ports coupled to a plurality of adjustment elements for adjusting a second plurality of beam port signals;
- a combined signal splitter for splitting a combined signal into a first split signal and a second split signal;
- a delay unit for delaying said first split signal;
- a first splitter for splitting said delayed first split signal into a first plurality of beam port signals; and
- a second splitter for splitting said second split into a second plurality of beam port signals,
- wherein said first and second plurality of beam port signals are adjusted and supplied to said first transform matrix and said second transform matrix, respectively.

14. A base station antenna system comprising:
- a multi-columnar antenna arrangement containing a plurality of first active antenna elements and a plurality of second active antenna elements, said plurality of first active antenna elements having polarization diversity from said plurality of second active antenna elements;
- a first set of adjustment elements coupled to each of said plurality of first active antenna elements for adjusting radiation characteristics of said first active antenna elements;
- a second set of adjustment elements coupled to each of said plurality of second active antenna elements for adjusting radiation characteristics of said second active antenna elements;
- a transform matrix constructed to form a plurality of narrow beam patterns that span different angular directions in a predetermined plane, said transform matrix having a plurality of beam ports and a plurality of antenna ports.

15. The system of claim 14, wherein said plurality of first active antenna elements and said plurality of second active antenna elements are transmit antenna elements, said transform matrix processes signals to be transmitted by said first and second active transmit antenna elements.

16. A base station antenna system comprising:
- a multi-columnar antenna arrangement containing a plurality of first active antenna elements and a plurality of second active antenna elements, said plurality of first active antenna elements having polarization diversity from said plurality of second active antenna elements;
- a first transform matrix, coupled to said multi-columnar antenna arrangement, and constructed to form a plurality of narrow beam patterns that span different angular directions in a predetermined plane, said first transform matrix being associated with said plurality of first active antenna elements and having a plurality of beam ports coupled to a plurality of first transform adjustment elements for adjusting a first plurality of beam port signals;
- a second transform matrix, coupled to said multi-columnar antenna arrangement, constructed to form a plurality of narrow beam patterns that span different angular directions in a predetermined plane, said second transform matrix being associated with said plurality of second active antenna elements and having a plurality of beam ports coupled to a plurality of second transform adjustment elements for adjusting a second plurality of beam port signals;
- a signal splitter for splitting a combined signal into a first split signal and a second split signal;
- a first set of adjustment elements for adjusting said first split signal;
- a second set of adjustment elements for adjusting said second split signal;
- a first splitter for splitting said adjusted first split signal into a first plurality of beam port signals; and
- a second splitter for splitting said adjusted second split signal into a second plurality of beam port signals,
- wherein said first and second plurality of beam port signals are further respectively adjusted by said first and second transform adjustment elements and then respectively supplied to said first transform matrix and said second transform matrix.

17. A base station multi-carrier antenna system comprising:
- a multi-columnar antenna arrangement containing a plurality of active antenna elements, said elements comprising transmit elements arranged at a predetermined distance from one another and receive elements arranged at said predetermined distance from one another, said transmit and receive elements being interleaved with each other;
- a transform matrix, coupled to said multi-columnar antenna arrangement, constructed to form a plurality of narrow beam patterns that span different angular directions in a predetermined plane, said transform matrix having a plurality of beam ports and for defining a phase relationship, thereby to provide a phased array for each input port of the transmission matrix, and each output port of the receive matrix.
- a plurality of frequency separators, coupled to said beam ports, for separating signals from said beam ports into a plurality of constituent carrier frequency signals;
- a plurality of adjustment elements for adjusting each of said plurality of carrier frequency signals;
- a plurality of combiners, wherein each of said plurality of combiners combines all adjusted carrier frequency signals of a predetermined frequency and outputs a predetermined frequency signal; and
- a plurality of filters, wherein each of said plurality of filters is tuned to said predetermined frequency signal and is coupled to each of said combiners.

18. A base station antenna array arrangement for a wireless communication network, comprising:
  a plurality of transmit active antenna elements located at a predetermined distance from one another, each active antenna element including:
  a transmit amplifier;
  a bandpass filter receiving a signal from the transmit amplifier;
  an antenna structure constructed and arranged to radiate an electromagnetic wave corresponding to a signal from the bandpass filter; and
  a plurality of receive active antenna elements located at said predetermined distance from one another, said receive active antenna elements being interleaved with said transmit antenna elements, each receive active antenna element including:
  a structure for receiving signals,
  a receive bandpass filter arranged to receive signals from the antenna element, and
  a receive amplifier for amplifying signals from the filter,
  wherein said transmit antenna elements and receive antenna elements are vertically arranged in a repeating alternating configuration and are separately controllable to provide respectively transmit and receive phased arrays.

19. The base station antenna arrangement of claim 18, wherein each of said transmit antenna elements is adjacent to a corresponding one of said receive antenna elements.

* * * * *